US011526450B2

(12) United States Patent
Bradshaw et al.

(10) Patent No.: US 11,526,450 B2
(45) Date of Patent: Dec. 13, 2022

(54) MEMORY SYSTEM FOR BINDING DATA TO A MEMORY NAMESPACE

(71) Applicant: Micron Technology, Inc., Boise, ID (US)

(72) Inventors: Samuel E. Bradshaw, Sacramento, CA (US); Shivasankar Gunasekaran, Folsom, CA (US); Hongyu Wang, Folsom, CA (US); Justin M. Eno, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/192,744

(22) Filed: Mar. 4, 2021

(65) Prior Publication Data
US 2021/0191875 A1 Jun. 24, 2021

Related U.S. Application Data

(63) Continuation of application No. 16/573,535, filed on Sep. 17, 2019, now Pat. No. 10,963,396.

(51) Int. Cl.
*G06F 12/1009* (2016.01)
*G06F 12/1027* (2016.01)
*G06F 3/06* (2006.01)
*G06F 9/50* (2006.01)

(52) U.S. Cl.
CPC ........ *G06F 12/1009* (2013.01); *G06F 3/0611* (2013.01); *G06F 3/0656* (2013.01); *G06F 3/0679* (2013.01); *G06F 9/5016* (2013.01); *G06F 12/1027* (2013.01)

(58) Field of Classification Search
CPC ............ G06F 12/1009; G06F 12/1027; G06F 3/0611; G06F 3/0656; G06F 9/5016
See application file for complete search history.

(56) References Cited

U.S. PATENT DOCUMENTS 5,301,287 A * 4/1994 Herrell ................ G06F 12/0835
711/202
6,256,714 B1 * 7/2001 Sampsell ............ G06F 9/44557
711/159
7,552,282 B1 ‡ 6/2009 Bermingham et al. .....................
G06F 12/0802
711/11

(Continued)

OTHER PUBLICATIONS

International Search Report and Written Opinion, PCT/US2020/051063, dated Dec. 21, 2020.‡

(Continued)

*Primary Examiner* — Sean D Rossiter
(74) *Attorney, Agent, or Firm* — Greenberg Traurig

(57) ABSTRACT

A computer system includes physical memory devices of different types that store randomly-accessible data in a main memory of the computer system. In one approach, an operating system allocates memory from a namespace for use by an application. The namespace is a logical reference to physical memory devices in which physical addresses are defined. The namespace is bound to a memory type. In response to binding the namespace to the memory type, the operating system adjusts a page table to map a logical memory address in the namespace to a memory device of the memory type.

18 Claims, 13 Drawing Sheets

(56) References Cited

U.S. PATENT DOCUMENTS

| | | | |
|---|---|---|---|
| 7,669,003 B2 ‡ | 2/2010 | Sinclair et al. | G06F 12/0246 711/10 |
| 7,949,845 B2 ‡ | 5/2011 | Sinclair et al. | G06F 12/0246 711/17 |
| 8,055,832 B2 ‡ | 11/2011 | Sinclair et al. | G06F 12/0246 711/10 |
| 8,291,151 B2 ‡ | 10/2012 | Sinclair | G06F 3/064 711/10 |
| 8,452,929 B2 ‡ | 5/2013 | Bennett | G06F 12/0246 711/16 |
| 9,448,743 B2 ‡ | 9/2016 | Prins et al. | G06F 12/0246 |
| 9,558,040 B2 | 1/2017 | Maillet et al. | |
| 9,710,377 B1 | 7/2017 | Kuzmin et al. | |
| 9,784,084 B2 ‡ | 10/2017 | Sun et al. | C10G 1/00 |
| 10,108,220 B2 | 10/2018 | Wang et al. | |
| 10,152,428 B1 | 12/2018 | Alshawabkeh et al. | |
| 10,223,228 B2 | 3/2019 | Boss et al. | |
| 10,248,447 B2 | 4/2019 | Leitner | |
| 10,268,390 B2 | 4/2019 | Warfield et al. | |
| 10,289,555 B1 ‡ | 5/2019 | Michaud | G06F 12/0862 |
| 10,409,603 B2 * | 9/2019 | Baghsorkhi | G06F 9/3004 |
| 10,963,396 B1 | 3/2021 | Bradshaw et al. | |
| 11,138,121 B2 | 10/2021 | Hagersten et al. | |
| 11,269,780 B2 | 3/2022 | Curewitz et al. | |
| 2003/0018877 A1 ‡ | 1/2003 | Gaskins et al. | G06F 12/1027 711/20 |
| 2004/0261078 A1 ‡ | 12/2004 | Abou-Emara | G06F 9/52 718/10 |
| 2005/0188119 A1 | 8/2005 | Hayden | |
| 2005/0235131 A1 ‡ | 10/2005 | Ware | G06F 12/10 711/20 |
| 2008/0114854 A1 ‡ | 5/2008 | Wong | H04L 67/1095 709/21 |
| 2009/0254728 A1 * | 10/2009 | Kamensky | G06F 12/0223 711/170 |
| 2009/0254851 A1 | 10/2009 | Scott et al. | |
| 2010/0095049 A1 | 4/2010 | Manning | |
| 2012/0054425 A1 ‡ | 3/2012 | Matas | G06F 9/3851 711/10 |
| 2012/0066473 A1 * | 3/2012 | Tremaine | G06F 13/1694 711/E12.001 |
| 2014/0025923 A1 ‡ | 1/2014 | Klein | G06F 3/0647 711/20 |
| 2014/0089585 A1 ‡ | 3/2014 | Nakajima | G06F 13/1663 711/11 |
| 2014/0089608 A1 ‡ | 3/2014 | King | G06F 12/1081 711/15 |
| 2014/0136773 A1 ‡ | 5/2014 | Michalak | G06F 12/10 711/10 |
| 2014/0207741 A1 ‡ | 7/2014 | Morsi | G06F 16/125 707/68 |
| 2014/0215129 A1 ‡ | 7/2014 | Kuzmin et al. | G06F 12/0246 711/10 |
| 2014/0229669 A1 | 8/2014 | Sandstrom | |
| 2015/0326481 A1 | 11/2015 | Rector | |
| 2015/0370428 A1 | 12/2015 | Chan et al. | |
| 2016/0188221 A1 | 6/2016 | Janik | |
| 2016/0253259 A1 ‡ | 9/2016 | Jin et al. | G06F 12/1054 711/12 |
| 2017/0024137 A1 | 1/2017 | Kanno | |
| 2017/0147500 A1 * | 5/2017 | Furman | G06F 12/1045 |
| 2017/0153892 A1 | 6/2017 | Linsky | |
| 2017/0270041 A1 ‡ | 9/2017 | Talagala | G06F 12/08 |
| 2018/0004456 A1 | 1/2018 | Talwar et al. | |
| 2018/0024853 A1 * | 1/2018 | Warfield | G06F 9/45558 718/1 |
| 2018/0060228 A1 ‡ | 3/2018 | Arai | G06F 3/0608 |
| 2018/0060255 A1 ‡ | 3/2018 | Speier | G06F 12/06 |
| 2018/0217778 A1 | 8/2018 | Kusbel et al. | |
| 2018/0260135 A1 * | 9/2018 | Hayashida | G06F 13/1673 |
| 2018/0349168 A1 | 12/2018 | Ahmed | |
| 2019/0004961 A1 ‡ | 1/2019 | Boggs et al. | G06F 12/14 |
| 2019/0065248 A1 | 2/2019 | Ravindran et al. | |
| 2019/0095329 A1 | 3/2019 | Kumar et al. | |
| 2019/0114257 A1 ‡ | 4/2019 | Lin | G06F 3/0614 |
| 2019/0146927 A1 ‡ | 5/2019 | Frolikov | G06F 12/0246 711/103 |
| 2019/0187897 A1 | 6/2019 | Badam et al. | |
| 2019/0213165 A1 | 7/2019 | Pitigoi-aron et al. | |
| 2019/0266106 A1 ‡ | 8/2019 | Murphy | G06F 3/0611 |
| 2019/0370043 A1 ‡ | 12/2019 | Olderdissen | G06F 3/0673 |
| 2020/0081848 A1 ‡ | 3/2020 | Bae | G06F 12/0862 |
| 2020/0192576 A1 ‡ | 6/2020 | Nair | G06F 3/061 |
| 2020/0210272 A1 | 7/2020 | Zhang et al. | |
| 2021/0081121 A1 | 3/2021 | Curewitz et al. | |
| 2021/0081324 A1 | 3/2021 | Bradshaw et al. | |
| 2021/0081325 A1 | 3/2021 | Bradshaw et al. | |
| 2021/0081326 A1 | 3/2021 | Curewitz et al. | |
| 2022/0156201 A1 | 5/2022 | Curewitz et al. | |

OTHER PUBLICATIONS

International Search Report and Written Opinion, PCT/US2020/051058, dated Dec. 21, 2020.‡

International Search Report and Written Opinion, PCT/US2020/051065, dated Dec. 21, 2020.‡

International Search Report, PCT/US2020/050714, dated Dec. 17, 2020.‡

Accessing Stored Metadata to Identify Memory Devices in Which Data is Stored, U.S. Appl. No. 16/573,490, filed Sep. 17, 2019, Kenneth Curewitz et al., Docketed New Case—Ready for Examination, Oct. 21, 2019.

Page Table Hooks to Memory Types, U.S. Appl. No. 16/573,527, filed Sep. 17, 2019, Samuel Bradshaw et al., Final Rejection dated Nov. 10, 2020.

Memory System for Binding Data to a Memory Namespace, U.S. Appl. No. 16/573,535, filed Sep. 17, 2019, Samuel Bradshaw et al., Patented Case, Aug. 14, 2020.

Mapping Non-Typed Memory Access to Typed Memory Access, U.S. Appl. No. 16/573,541, filed Sep. 17, 2019, Kenneth Curewitz et al., Non Final Action dated Jan. 29, 2021.

* cited by examiner
‡ imported from a related application

| Page Table 900 | | | | | |
|---|---|---|---|---|---|
| Virtual Address | Physical Address | Memory Type | Process Identifier | Usage Data | Memory Device Identifier |
| ... | ... | ... | ... | ... | ... |
| Virtual Address | Physical Address | Memory Type | Process Identifier | Usage Data | Memory Device Identifier |

FIG. 9

| Namespace Table 1200 | | | | |
|---|---|---|---|---|
| Namespace A | Memory Type | Virtual Address | Physical Address | Data Identifier |
| Namespace B | Memory Type | Virtual Address | Physical Address | Data Identifier |
| Namespace C | Memory Type | Virtual Address | Physical Address | Data Identifier |
| ... | | | | |

FIG. 12

MEMORY SYSTEM FOR BINDING DATA TO A MEMORY NAMESPACE

RELATED APPLICATION

The present application is a continuation application of U.S. patent application Ser. No. 16/573,535, filed Sep. 17, 2019, and entitled "Memory System for Binding Data to a Memory Device," the entire disclosure of which application is hereby incorporated herein by reference.

FIELD OF THE TECHNOLOGY

At least some embodiments disclosed herein relate to memory systems in general and more particularly, but not limited to memory systems for binding data to a namespace.

BACKGROUND

Various types of memory devices can be used to store data in the main memory of a computer system. One type of volatile memory device is a dynamic random access memory (DRAM) device. Various types of non-volatile memory device can include a NAND flash memory device or a non-volatile random access memory (NVRAM) device.

In an operating system, memory management is responsible for managing the main memory of the computer system. The memory management tracks the status of memory locations in the main memory (e.g., a memory status of either allocated or free). Memory management further determines the allocation of memory among various processes running on the operating system. When memory is allocated to a process, the operating system determines the memory locations that will be assigned to the process.

In one approach, an operating system uses paged allocation to divide the main memory into fixed-sized units called page frames. A virtual address space of a software program is divided into pages having the same size. A hardware memory management unit maps pages to frames in physical memory. In a paged memory management approach, each process typically runs in its own address space.

In some cases, the memory management unit (MMU) is called a paged memory management unit (PMMU). The MMU manages all memory references used by the operating system and performs the translation of virtual memory addresses to physical addresses. The MMU typically divides a virtual address space, which is the range of addresses used by the processor, into pages.

In some approaches, the MMU uses a page table containing page table entries to map virtual page numbers to physical page numbers in the main memory. In some cases, a cache of page table entries called a translation lookaside buffer (TLB) is used to avoid the need to access a page table stored in the main memory when a virtual address is mapped. When using virtual memory, a contiguous range of virtual addresses can be mapped to several non-contiguous blocks of physical memory.

In some cases, a page table entry can include information about page usage. Various examples include information regarding whether data has been written to the page, when the page was last used, the types of processes (e.g., user mode or supervisor mode) that may read and write the page, and whether the page should be cached.

In one approach, the TLB is implemented as content-addressable memory (CAM). The search key is the virtual address, and the search result is a physical address. If the requested address is in the TLB, the physical address retrieved from the search is used to access a physical memory device. If the requested address is not in the TLB, the page table is accessed in main memory.

In some cases, a virtual memory management system uses process identifiers to associate each page to a process. The association of process identifiers with virtual pages can be helpful for selecting pages to page out. For example, if the main code page of a process has been paged out, there is a reduced likelihood of immediate need for other pages belonging to that process.

More generally, a computer system can have one or more memory sub-systems. A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a computer system can utilize a memory sub-system to store data at the memory components and to retrieve data from the memory components.

For example, a computer system can include one or more memory sub-systems attached to the computer system. The computer system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of device in the computer; and the operating system uses the device driver to offer resources and/or services provided by the type of device. A central processing unit (CPU) of a computer system can run an operating system and device drivers to provide the services and/or resources to application programs. The central processing unit (CPU) can run an application program that uses the services and/or resources. For example, an application program implementing a type of application can instruct the central processing unit (CPU) to store data in the memory components of a memory sub-system and retrieve data from the memory components.

An operating system of a computer system can allow an application program to use virtual addresses of memory to store data in, or retrieve data from, memory components of one or more memory sub-systems of the computer system. The operating system maps the virtual addresses to physical addresses of one or more memory sub-systems connected to the central processing unit (CPU) of the computer system. The operating system translates the memory accesses specified at virtual addresses to the physical addresses of the memory sub-systems.

A virtual address space can be divided into pages. A page of virtual memory can be mapped to a page of physical memory in the memory sub-systems. The operating system can use a paging technique to access a page of memory in a storage device via a page of memory in a memory module. At different time instances, the same virtual page of memory in a memory module can be used as proxy to access different physical pages of memory in the storage device or another storage device in the computer system.

A computer system can include a hypervisor (or virtual machine monitor) to create or provision virtual machines. A virtual machine is a computing device that is virtually implemented using the resources and services available in the computer system. The hypervisor presents the virtual machine to an operating system as if the components of virtual machine were dedicated physical components. A guest operating system runs in the virtual machine to manage resources and services available in the virtual machine, in a way similar to the host operating system running in the computer system. The hypervisor allows multiple virtual machines to share the resources of the computer system and allows the virtual machines to operate on the computer substantially independently from each other.

BRIEF DESCRIPTION OF THE DRAWINGS

The embodiments are illustrated by way of example and not limitation in the figures of the accompanying drawings in which like references indicate similar elements.

FIG. 9 illustrates an example page table having page table entries, in accordance with some embodiments.

FIG. 12 illustrates an example namespace table having records that map namespaces to different types of memory for a computer system, in accordance with some embodiments.

DETAILED DESCRIPTION

Figure 1:
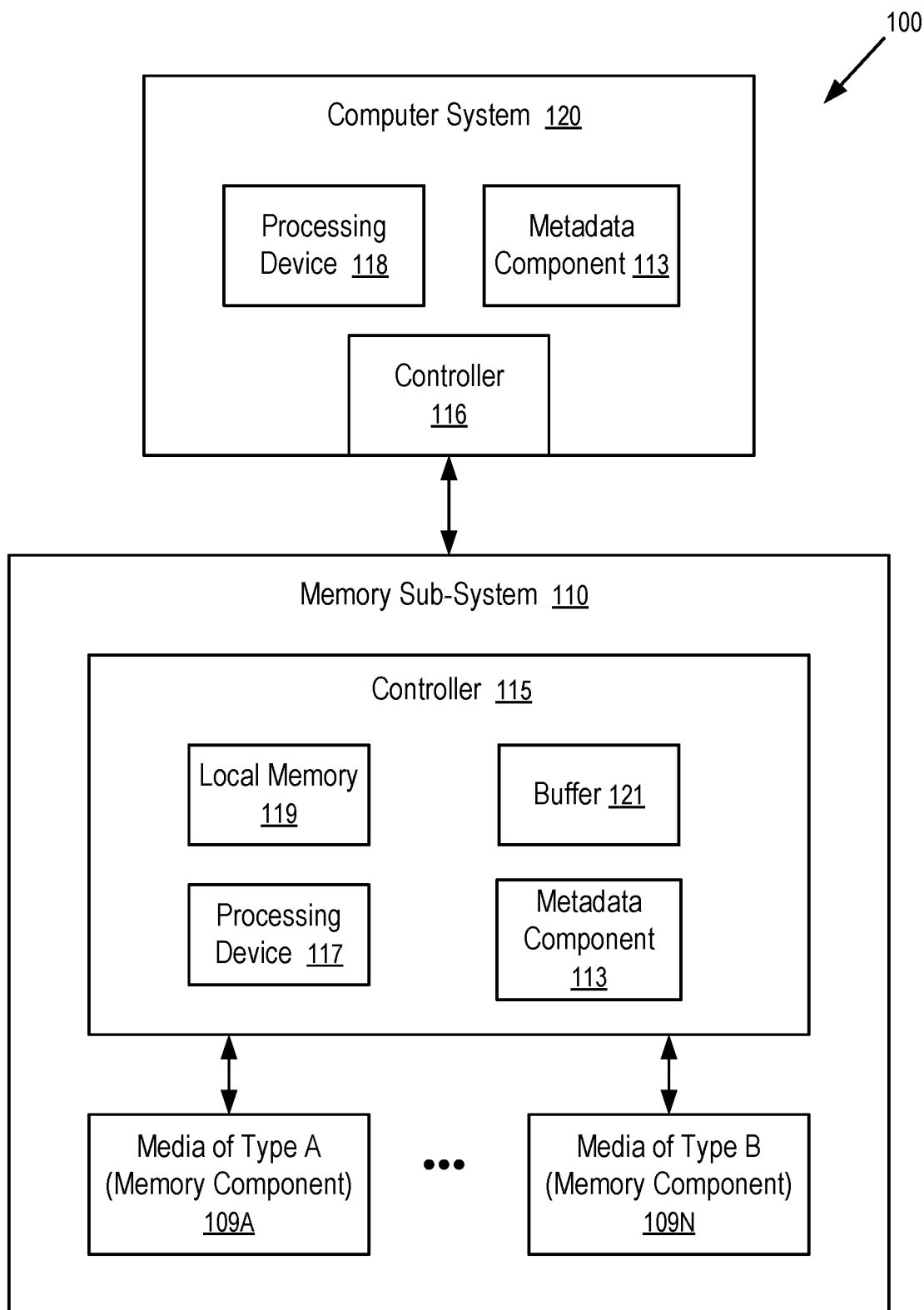
FIG. 1 illustrates an example computer system having a memory sub-system, in accordance with some embodiments.

At least some embodiments herein relate to accessing stored metadata to identify memory devices of a memory system in which data is stored. In various embodiments as discussed herein, the metadata can be stored and accessed by various types of computer systems. In one example, the computer system is a system-on-chip (SoC) device that stores metadata for managing memory usage by one or more processes running on the SoC device. In one example, a mobile device uses a SoC device to manage allocation of main memory for one or more applications that are running on the mobile device.

Other embodiments relate to page table entries that map virtual addresses of virtual pages to physical addresses in memory devices of different memory types. These embodiments are described in the section below titled "Page Table Hooks to Memory Types".

Yet other embodiments relate to binding data to a namespace in a memory system having physical memory of different memory types. These embodiments are described in the section below titled "Binding Data to a Namespace".

Prior computer systems often use different types of memory devices for storing data. One type of memory device typically used is DRAM, which is generally considered to provide fast read and write access. DRAM is commonly used for storing data in the main memory of a computer system.

Other memory devices, such as flash memory, are typically considered to be slower than DRAM. For example, read or write access latency for a DRAM is typically significantly less than read or write access latency for flash memory. As a particular example, write access latency for some memory devices can be tens or even hundreds of times greater than for DRAM devices.

In prior computer systems that use different types of physical memory devices for storing data in main memory, a technical problem exists in which the processor does not have an awareness of how memory for various processes is actually mapped to the memory devices. For example, the processor may allocate a virtual address range to a process. However, the processor is unaware of how the virtual address range is mapped to the different memory devices.

In one example, if the virtual address range for a process is mapped to physical memory devices (e.g., flash memory) that are significantly slower than other memory devices (e.g., DRAM), then the process can be forced to run slowly due to an inability to rapidly access data from main memory that is needed for continuing execution of the process. For example, the process may need a response from main memory in order to continue data computations or other processing (e.g., a response that includes data for a read access request made by a processor to main memory to obtain data needed during execution by the process). If the data needed from main memory is actually stored in a slow physical memory device, then the processing is significantly delayed while waiting for the response.

Various embodiments of the present disclosure provide a technological solution to one or more of the above technical problems. In some embodiments, a computer system stores data regarding the latency of memory devices used by the computer system (e.g., memory devices used to provide main memory). In one example, the latencies of various memory regions that are visible to a processor of the computer system are known (e.g., as represented by information collected and/or aggregated in stored metadata, as discussed below).

In some embodiments, the processor, an operating system, and/or an application (as programmed by a software designer) can initiate and/or perform actions by the computer system to avoid significant process delays due to slow memory access. For example, a high priority process that needs fast memory response can be configured to run in DRAM.

In another example, a priority for an application executing on a mobile device can be monitored. When the priority for the application increases (e.g., changes from low to high), then the processor and/or operating system can automatically transfer the application out of an address range of main memory that corresponds to a slow memory device, and move the application to a new address range that corresponds to a fast memory device.

In one example, memory device types include DRAM, NVRAM, and NAND flash. The priority of a process is determined by the processor (e.g., based on data usage patterns by the process). Based on stored metadata regarding address range mapping to these memory device types, the processor allocates the process to an address range having an appropriate memory latency. For example, the processor can determine whether a process has a low, intermediate, or high priority. Based on determining that the process has an intermediate priority, software and/or data associated with the process are stored in an address range corresponding to physical storage in the NVRAM memory device type, which has an intermediate latency.

In one example, the NVRAM device type is a 3D XPoint memory. In one example, the NVRAM device type can be resistive random-access memory, magnetoresistive RAM, phase-change RAM, and/or ferroelectric RAM. In one example, an NVRAM chip is used as main memory of a computer system (e.g., NVDIMM-P). In one example, an NVRAM device is implemented using non-volatile 3D XPoint memory in a DIMM package.

In another example, if the processor and/or operating system are not configured to automatically transfer the application to a different address range in response to a priority change, the software code of the application itself can be configured to read one or more values from the stored metadata. Based on the read values, the application itself can manage data storage so that data is preferentially stored in address ranges that correspond to faster memory devices. In one example, the application can determine relative latencies of available memory devices in a computer system based on reading or otherwise being provided access to the stored metadata. In one example, the stored metadata specifies what data is on which memory device of various different memory devices having different latencies. By specifying the memory device in this manner, the application can determine a latency of access for particular data depending on the memory device being used to store the data.

In one example, an application on a mobile device reads stored metadata when requesting an allocation of main memory by an operating system (e.g., executing on a system-on-chip device). In one example, the application makes a request for an address range in main memory that corresponds to a particular type of memory device and/or a particular latency associated with memory read or write access.

In one example, the application reads or otherwise accesses the stored metadata to determine which memory is fast, and which memory is slow. In a first context of the mobile device, the application makes a request for allocation of fast memory. In a second context of the mobile device, the application makes a request for allocation of slow memory. In one example, in response to the detection of a predetermined context, the application initiates or makes a request for a change in allocation of memory. In one example, the application determines a change in context based on an updated query made to the stored metadata (e.g., by the processor), and/or data (e.g., operating characteristics of the mobile device) provided to the application by the processor of the computer system.

In one embodiment, a computer system includes a first memory device (e.g., DRAM) and a second memory device (e.g., NVRAM or NAND flash), and one or more processing devices (e.g., a CPU or system on a chip (SoC)). The computer system further includes memory containing instructions configured to instruct the one or more processing devices to: access memory in an address space maintained by an operating system, the accessing including accessing the first memory device and the second memory device using addresses in the address space; store metadata that associates a first address range of the address space with the first memory device, and a second address range of the address space with the second memory device; and manage, by the operating system based on the stored metadata, processes including a first process and a second process, where data for the first process is stored in the first memory device, and data for the second process is stored in the second memory device.

In one embodiment, a computer system uses memory device types including DRAM, NVRAM, and NAND flash. In one example, the DRAM is faster than the NVRAM, which is faster than the NAND flash. The computer system is configured so that all three different types of memory can be accessed directly by a processor of the computer system using a virtual memory address. In one example, the processor communicates with a memory management unit to implement a virtual to physical address mapping system.

In one embodiment, an application is not pre-programmed or otherwise configured to manage or handle optimization of memory allocation based on different types of memory devices. For example, this may occur for legacy software programs. In this type of situation, an operating system can be configured to manage optimization of memory allocation for the application.

In one example, the operating system detects or otherwise determines one or more characteristics of an application. Based on the characteristics, the operating system uses the stored metadata to assign one or more address ranges in main memory to the application. In one example, the characteristics are determined based on information provided by the application itself (e.g., when the application is launched on a mobile device). In another example, the characteristics are provided by a computing device other than the computer system on which the application is being executed. In one example, a central repository is used to store and update a database or table of characteristics for applications. In one example, the central server provides an indication to the operating system regarding a type of physical memory to use.

In one embodiment, the operating system determines a context associated with a computer system and/or execution of an application. Based on this context, the operating system uses the stored metadata to assign one or more address ranges in main memory to the application.

In one embodiment, stored metadata is used for identifying devices in which data is stored. A memory sub-system has multiple physical memory devices (e.g., DRAM, NVRAM, and NAND flash) that can be addressed by a processor (e.g., SoC) in a memory address space. The metadata is used to specify which memory address regions are mapped to which physical memory devices. The metadata can be loaded into the DRAM and/or the processor (e.g., loaded into a cache of the processor) to determine what data is on which device, and/or used to estimate the latency of access for the respective data.

In one embodiment, an application is executing on a mobile device having a processor that uses a main memory. The application requests that an operating system of the mobile device allocate a portion of main memory for use by the application. The allocated memory is in a logical/virtual memory space (e.g., memory addresses as seen by the programmer and by the execution units of the processor are virtual). In one embodiment, the virtual memory addresses are mapped to real/physical memory by page tables. A portion of the mapping data in the page tables is cached in a buffer of the processor. In one example, the buffer is a translation lookaside buffer (TLB).

In one embodiment, a computer system includes DRAM, NVRAM, and NAND flash memory devices. A processor of the computer system randomly accesses main memory by address. Addresses within the main memory correspond to physical locations of data storage on these three types of memory devices. In one example, each of the devices is accessed by the processor using a synchronous memory bus. In one example, the DRAM is synchronous dynamic random access memory (SDRAM) having an interface synchronous with a system bus carrying data between a CPU and a memory controller hub.

FIG. 1 illustrates an example computing environment 100 having a memory sub-system 110, in accordance with some embodiments. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module include a DIMM and an NVDIMM. In some embodiments, the memory sub-system 110 is a hybrid memory/storage sub-system. In general, the computing environment 100 can include a computer system 120 that uses the memory sub-system 110. For example, the computer system 120 can write data to the memory sub-system 110 and read data from the memory sub-system 110.

The computer system 120 can be a computing device such as a mobile device, IoT device, desktop computer, laptop computer, network server, or such computing device that includes a memory and a processing device. The computer system 120 can include or be coupled to the memory sub-system 110 so that the computer system 120 can read data from or write data to the memory sub-system 110. The computer system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), a double data rate (DDR) memory bus, etc. The physical host interface can be used to transmit data between the computer system 120 and the memory sub-system 110. The computer system 120 can further utilize an NVM Express (NVMe) interface to access the memory components 109A to 109N when the memory sub-system 110 is coupled with the computer system 120 by the PCIe interface. The physical host interface can provide an interface for passing control, address, data, and other signals between the memory sub-system 110 and the computer system 120.

FIG. 1 illustrates memory sub-system 110 as an example. In general, the computer system 120 can access multiple memory sub-systems via a shared communication connection, multiple separate communication connections, and/or a combination of communication connections. In one example, each memory sub-system 110 can be a different type of memory device that is randomly accessed by processing device 118 over a memory bus.

The computer system 120 includes the processing device 118 and a controller 116. The processing device 118 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the computer system 120 and one or more memory sub-systems 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the computer system 120.

The controller 116 of the computer system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of various different types of non-volatile memory components and/or volatile memory components. An example of a non-volatile memory component includes a negative-AND (NAND) type flash memory. In one example, each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the computer system 120.

Although non-volatile memory components such as NAND type flash memory are one example, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric transistor random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a 3D XPoint array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the computer system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the computer system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the computer system 120 via the physical host interface. The host interface circuitry can convert the commands received from the computer system into command instructions to access the memory components 109A to 109N as well as convert responses associated with the memory components 109A to 109N into information for the computer system 120.

The memory sub-system 110 can also include additional circuitry or components that are not illustrated. In some embodiments, the memory sub-system 110 can include a cache or buffer 121 (e.g., DRAM or SRAM) and address circuitry (e.g., a row decoder and a column decoder) that can receive an address from the controller 115 and decode the address to access the memory components 109A to 109N.

The computing environment 100 includes a metadata component 113 in the computer system 120 that stores metadata used to identify memory devices in which data is stored (e.g., as discussed in various embodiments above). A portion of metadata component 113 can reside on computer system 120 and/or memory sub-system 110. In one example, a portion of the metadata is stored in local memory 119 and/or buffer 121. In one example, a portion of the metadata is alternatively and/or additionally stored in a cache of controller 116 (e.g., stored in a translation lookaside buffer).

In one example, the memory sub-system 110 can provide access for computer system 120 to data in different types of memory devices via a DDR or other type of synchronous memory bus. In one embodiment, the access is provided to data in NVRAM on a DIMM and to data in a DRAM. In one example, data is made accessible in a random access memory address space of the computer system 120 for access during host read/write requests made over the DDR memory bus.

In one example, computer system 120 sends a page-in request (for access to a page) to controller 115. In response to receiving the page-in request, controller 115 moves a page from a slow media such as a non-volatile memory device to a volatile memory device (e.g., DRAM on memory sub-system 110).

In one example, computer system 120 sends a page-out request to controller 115. In response to receiving the page-out request, controller 115 moves data out of volatile memory (e.g., DRAM on memory sub-system 110) to non-volatile memory via buffer 121.

In some embodiments, the controller 116 and/or the processing device 118 in the computer system 120 includes at least a portion of the metadata component 113. For example, the controller 116 and/or the processing device 118 can include logic circuitry implementing the metadata component 113. For example, the processing device 118 (processor) of the computer system 120 can be configured to execute instructions stored in memory for performing operations that identify in which devices data is stored for the metadata component 113 as described herein. In some embodiments, the metadata component 113 is part of an operating system of the computer system 120, a device driver, or an application (e.g., an application executing on computer system 120).

In some embodiments, the controller 115 and/or the processing device 117 in the memory sub-system 110 includes at least a portion of the metadata component 113. For example, the controller 115 and/or the processing device 117 can include logic circuitry implementing the metadata component 113.

In one example, a central processing unit (CPU) can access memory in a memory system connected to the CPU. For example, the central processing unit (CPU) can be configured to access the memory based on a query to stored metadata of metadata component 113.

Figure 2:
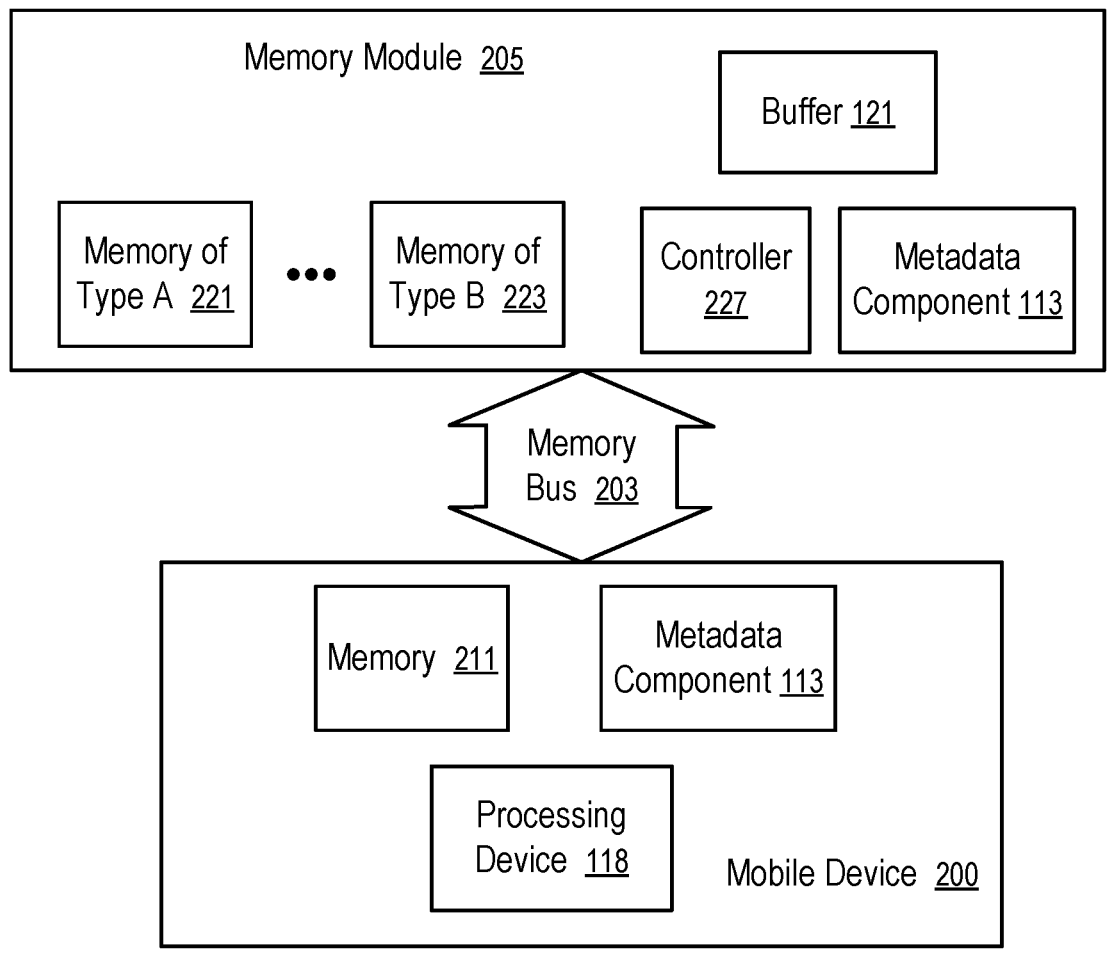
FIG. 2 shows a mobile device that accesses different types of memory in a memory module using a memory bus, in accordance with some embodiments.

FIG. 2 shows a mobile device 200 that accesses different types of memory in a memory module 205 using a memory bus 203, in accordance with some embodiments. FIG. 2 shows a computer system having different types of memory. The computer system of FIG. 2 includes a mobile device 200, and a memory module 205 connected to the mobile device 200 via memory bus 203. The memory module 205 is an example of the memory sub-system 110 illustrated in FIG. 1.

The mobile device 200 includes processing device 118, which can be a central processing unit or a microprocessor with one or more processing cores. The mobile device 200 can have a cache memory 211. At least a portion of the cache memory 211 can be optionally integrated within the same integrated circuit package of the processing device 118.

The memory module 205 illustrated in FIG. 2 has multiple types of memory (e.g., 221 and 223). For example, memory of type A 221 (e.g., DRAM) is faster than memory of type B 223 (e.g., NVRAM). For example, the memory bus 203 can be a double data rate bus. In general, several memory modules (e.g., 205) can be coupled to the memory bus 203.

The processing device 118 is configured via instructions (e.g., an operating system and/or one or more device drivers) to access a portion of memory in the computer system using metadata component 113. For example, memory of type B 223 (e.g., NVRAM) of the memory module 205 can be accessed or memory of type A 221 (e.g., DRAM) of the memory module 205 can be accessed. In one embodiment, memory of type B 223 of the memory module 205 is accessible only through addressing the memory of type A 221 of the memory module 205.

A controller 227 can be provided in the memory module 205 to manage data access to the memory of type A 221 and the memory of type B 223. In one embodiment, controller 227 multiplexes access to DRAM or NVRAM by mobile device 200 and memory module 205 when transferring data to or from buffer 121. In one example, memory bus 203 provides a host DDR channel as the DDR interface between mobile device 200 and memory module 205. In one example, once a page is retrieved from NVRAM memory into buffer 121, the page can be loaded for access by the mobile device via a conventional DDR4 slot (e.g., a host DDR channel).

In general, the memory sub-systems (e.g., 205) can include media, such as memory (e.g., 221, . . . , 223). The memory (e.g., 221, . . . , 223) can include volatile memory, non-volatile memory (NVM), and/or a combination of such. The processing device 118 can write data to each of the memory sub-systems (e.g., memory module 205) and read data from the memory sub-systems (e.g., memory module 205) directly or indirectly.

In one embodiment, memory module 205 provides memory bus access to non-volatile memory or volatile memory by using buffer 121. In one example, memory module 205 is a DIMM coupled to a mobile device 200 via a DDR bus. The storage media is, for example, cross-point memory.

In one embodiment, the mobile device communicates with the memory module via a communication channel for read/write operations (e.g., using a DDR4 bus). The mobile device can have one or more Central Processing Units (CPUs) to which computer peripheral devices, such as the memory module, may be attached via an interconnect, such as a computer bus (e.g., Serial AT Attachment (SATA), Peripheral Component Interconnect (PCI), PCI eXtended (PCI-X), PCI Express (PCIe)), a communication portion, and/or a computer network.

In one embodiment, the memory module can be used to store data for a processor in the non-volatile or volatile storage media. The memory module has a host interface that implements communications with the mobile device using the communication channel. In one embodiment, the memory module 205 has a controller 227 running, for example, firmware to perform operations responsive to communications from the processing device 118. In one example, the memory module includes volatile Dynamic Random-Access Memory (DRAM) and NVRAM. The DRAM and NVRAM store data accessible by the processing device 118 in a memory address space.

As illustrated, the computer system of FIG. 2 is used to implement a mobile device. The processing device 118 can read data from or write data to the memory sub-systems (e.g., 205).

A physical host interface can be used to transmit data between the processing device 118 and the memory sub-system (e.g., 205). The physical host interface can provide an interface for passing control, address, data, and other signals between the memory sub-system (e.g., 205) and the processing device 118.

In general, a memory sub-system (e.g., memory module 205) includes a printed circuit board that connects a set of memory devices, such as memory integrated circuits, that provides the memory (e.g., 221, . . . , 223). The memory (e.g., 221, . . . , 223) on the memory sub-system (e.g., 205) can include any combination of the different types of non-volatile memory devices and/or volatile memory devices.

In some implementations, the memory (e.g., 221, . . . , 223) can include, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and/or a cross-point array of non-volatile memory cells.

A memory sub-system (e.g., memory module 205) can have a controller (e.g., 227) that communicates with the memory (e.g., 221, . . . , 223) to perform operations such as reading data, writing data, or erasing data in the memory (e.g., 221, . . . , 223) and other such operations, in response to requests, commands or instructions from the processing device 118. The controller (e.g., 227) can include hardware such as one or more integrated circuits and/or discrete components, a buffer memory, or a combination thereof. The controller (e.g., 227) can be a microcontroller, special purpose logic circuitry (e.g., a field programmable gate array (FPGA), an application specific integrated circuit (ASIC), etc.), or another suitable processor. The controller (e.g., 227) can include one or more processors (processing devices) configured to execute instructions stored in local memory.

The local memory of the controller (e.g., 227) can include an embedded memory configured to store instructions for performing various processes, operations, logic flows, and routines that control operation of the memory sub-system (e.g., 205), including handling communications between the memory sub-system (e.g., 205) and the processing device 118, and other functions described in greater detail below. Local memory of the controller (e.g., 227) can include read-only memory (ROM) for storing micro-code and/or memory registers storing, e.g., memory pointers, fetched data, etc.

While the example memory sub-system 205 in FIG. 2 has been illustrated as including controller 227, in another embodiment of the present disclosure, a memory sub-system (e.g., 205) may not include a controller (e.g., 227), and can instead rely upon external control (e.g., provided by a processor or controller separate from the memory sub-system (e.g., 205)).

In general, the controller (e.g., 227) can receive commands, requests or instructions from the processing device 118 in accordance with a standard communication protocol for the communication channel (e.g., 203) and can convert the commands, requests or instructions in compliance with the standard protocol into detailed instructions or appropriate commands within the memory sub-system (e.g., 205) to achieve the desired access to the memory (e.g., 221, . . . , 223). For example, the controller (e.g., 227) can be responsible for operations such as address translations between a logical address and a physical address that are associated with the memory (e.g., 221, . . . , 223). The controller (e.g., 227) can further include host interface circuitry to communicate with the processing device 118 via the physical host interface. The host interface circuitry can convert the commands received from the processing device 118 into command instructions to access the memory devices (e.g., 221, . . . , 223) as well as convert responses associated with the memory devices (e.g., 221, . . . , 223) into information for the processing device 118.

The memory sub-system (e.g., 205) can also include additional circuitry or components that are not illustrated. In some implementations, the memory sub-system (e.g., 205) can include a cache or buffer (e.g., DRAM) and address circuitry (e.g., a row decoder and a column decoder) that can receive an address from the controller (e.g., 227) and decode the address to access the memory (e.g., 221, . . . , 223).

In one example, the memory bus 203 has one or more connectors to provide the memory sub-system (e.g., 205) with power and/or communicate with the memory sub-system (e.g., 205) via a predetermined protocol; and the memory sub-system (e.g., 205) has one or more connectors to receive the power, data and commands from the processing device 118. In one example, the processing device 118 can execute one or more operating systems to provide services, including memory access in which a portion of memory (e.g., a page stored in NVRAM) in the computer system is accessed using synchronous memory access.

Figure 3:
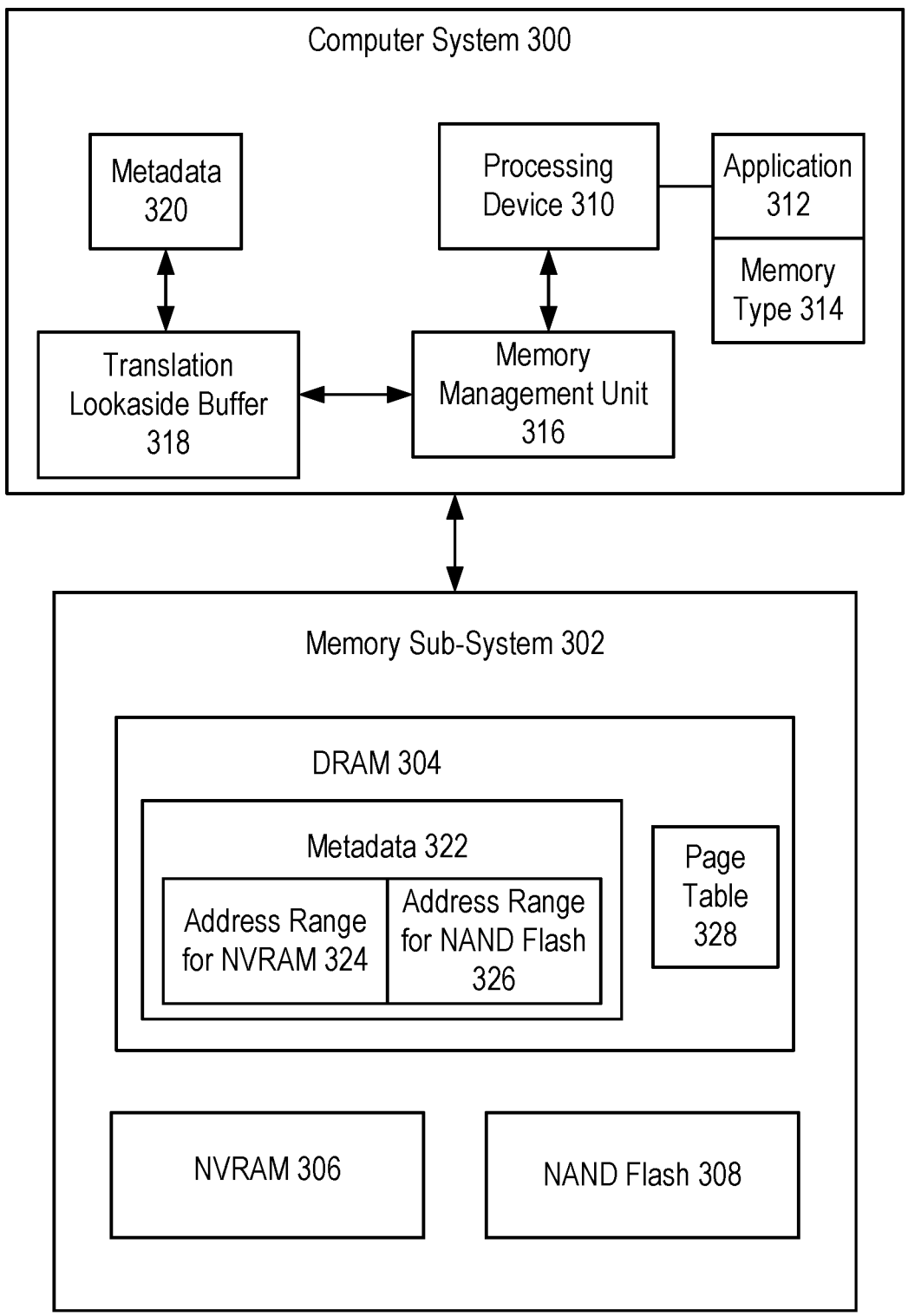
FIG. 3 illustrates an example computer system that stores metadata used to access memory devices in a memory sub-system, in accordance with some embodiments.

FIG. 3 illustrates an example computer system 300 that stores metadata 320 used to access memory devices in a memory sub-system 302, in accordance with some embodiments. The memory devices accessed in memory sub-system 302 include DRAM 304, NVRAM 306, and NAND flash 308. In one embodiment, computer system 300 alternatively and/or additionally stores metadata 322 in DRAM 304 that is used to access the memory devices.

In one embodiment, a processing device 310 of computer system 300 accesses memory in an address space. In one example, the memory is main memory used by processing device 310 when executing one or more applications. The processing device 310 accesses different memory devices using addresses in the address space.

In one embodiment, metadata 320, 322 associates a first address range of the address space with a memory device (e.g., DRAM 304) and a second address range of the address space with a different memory device (e.g., NVRAM 306 or NAND flash 308). In one example, the latency of DRAM 304 is less than the latency of NVRAM 306 and NAND flash 308.

The applications executing on processing device 310 include application 312, which is configured to include a memory type 314. When the application 312 is initially launched, application 312 provides memory type 314 to processing device 310 along with a request for an allocation of memory in the main memory of computer system 300.

In response to the request for the allocation of memory, processing device 310 makes a query to metadata 320 and/or sends a query to metadata 322. Based on a result from one or both of these queries, processing device 310 allocates an address range in the address space to application 312.

In one embodiment, application 312 makes a request to processing device 310 for an indication of latency associated with the memory devices. Processing device 310 accesses metadata 320, 322 to obtain a result, and based on this result provides the indication of latency to application 312. In response to receiving the indication of latency, application 312 makes a request for an allocation of memory corresponding to a specific one of the memory devices, a memory device corresponding to memory type 314, or a request for an allocation of memory that has performance characteristics meeting at least one or more predetermined thresholds and/or requirements.

In one embodiment, metadata 322 stores data that associates an address range in a virtual address space with physical addresses in the memory devices of memory sub-system 302. In one example, metadata 322 stores address range 324 for NVRAM, and address range 326 for NAND flash. In one example, address range 324 maps a virtual or logical address of processing device 310 to a physical address of NVRAM 306. In one example, address range 326 maps a virtual or logical address of processing device 310 to a physical address of NAND flash 308. In one embodiment, metadata 320 or 322 stores one or more address ranges mapping addresses of processing device 310 for data stored in DRAM 304.

In one embodiment, metadata 322 is stored as part of page table 328, which provides a mapping of virtual addresses to physical addresses for a memory management unit 316 of computer system 300. Processing device 310 provides a virtual address to memory management unit 316, which accesses a translation lookaside buffer 318 to obtain a physical address in one of the memory devices of memory sub-system 302.

In one embodiment, translation lookaside buffer 318 is a cache that stores a portion of the data from page table 328. In one example, buffer 318 stores a portion of metadata 322. In one embodiment, a portion of metadata 320 stored on computer system 300 is copied to translation lookaside buffer 318 for access by memory management unit 316 when accessing a memory device in memory sub-system 302.

In one embodiment, processing device 310 provides memory characteristics of the different memory devices to application 312. Application 312 makes a request for an allocation of memory based on the provided memory characteristics.

In one embodiment, processing device 310 receives a requested latency from application 312. An address range is allocated to the application 312 based on the requested latency.

In one embodiment, processing device 310 determines a priority associated with application 312. The address range allocated to application 312 is based on the determined priority. In one example, a faster memory device type is selected for use with the determined priority. Processing device 310 uses metadata 320, 322 to select an address range that physically stores data in a memory device of the selected faster memory device type.

In one embodiment, processing device 310 determines a change in priority of application 312. In one example, based on an increase in priority of application 312, processing device 310 changes a memory allocation that is used for application 312 in the address space. In one example, in response to the increase in priority, processing device 310 accesses metadata 320, 322 to determine an address range that corresponds to a faster physical memory device.

In one embodiment, processing device 310 determines a priority of application 312 based on observing characteristics associated with data access by application 312 in the address space. The observed characteristics can be used for allocating memory usage for application 312. In one embodiment, processing device 310 determines one or more latencies associated with physical memory devices. Metadata 320, 322 stores data regarding the determined one or more latencies, which can be used by processing device 310 when initially allocating and/or changing an allocation of main memory.

Figure 4:
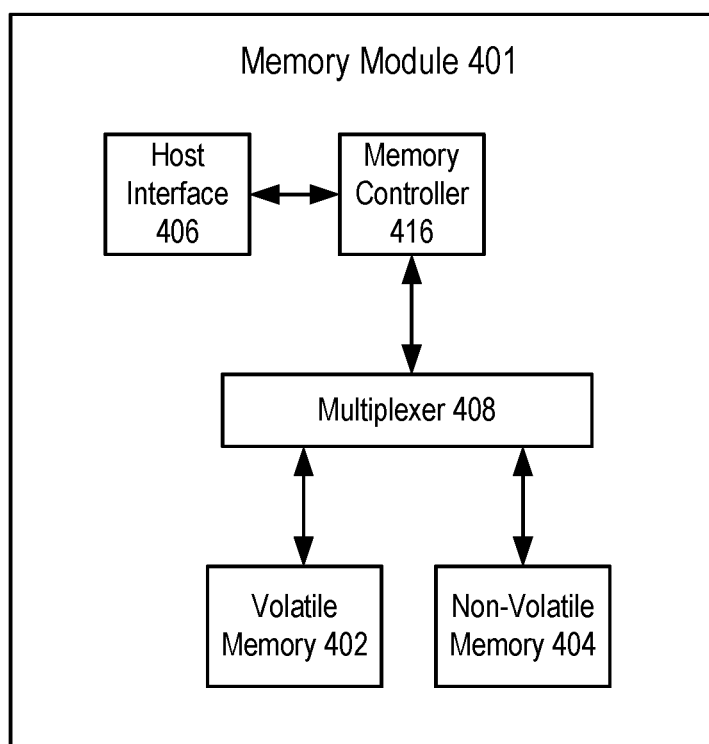
FIG. 4 shows a memory module configured for memory bus access by a host computer system to volatile and non-volatile memory of the memory module, in accordance with some embodiments.

FIG. 4 shows a memory module 401 configured for memory bus access by a host computer system (not shown) to volatile memory 402 and non-volatile memory 404, in accordance with some embodiments. Memory module 401 is an example of memory sub-system 302 or memory module 205. In one example, memory module 401 is a hybrid DIMM. Volatile memory 402 is for example DRAM.

Memory module 401 uses multiplexer 408 to provide access to volatile memory 402 and non-volatile memory 404 by memory controller 416. Memory controller 416 is coupled to host interface 406 for handling read/write access by a host system. In one embodiment, multiplexer 408 is controlled based on signals received from memory controller 416 in response to receiving read or write commands from the host system via host interface 406.

In one example, a host system accesses a memory space (e.g., DRAM memory address space) on the memory module 401 (e.g., a DIMM). The DIMM exposes itself to the host as a channel of DRAM. In one embodiment, a hypervisor of the host system controls data movement on the DIMM. For example, a request is made for moving memory blocks in and out of the DRAM address space and exposing the DRAM pages to software running on the host. The software is, for example, executing in a virtual machine (VM).

In one example, a page in/out control path is provided for a driver to request a page that is currently in DRAM or in NVRAM. In one example, the NVRAM has a much larger capacity than the DRAM.

In one example, memory module 401 is implemented as a DIMM. The non-volatile memory 404 is provided by 3D XPoint memory packages. In one example, pages of data obtained from the 3D XPoint memory are copied in and out of a buffer (page in/page out).

In one example, the host system has read/write access to any DRAM or NVRAM address using normal DDR4 timing. For example, the host can generate arbitrary traffic per DDR4 rules during those times.

In one example, the full DDR address space of the non-volatile memory 404 is exposed to the host system. According to various embodiments, a controller (e.g., controller 116) of computer system 120 can operate in the same way (e.g., same read/write and refresh timing cycles) as it would for access to a conventional DRAM.

Figure 5:
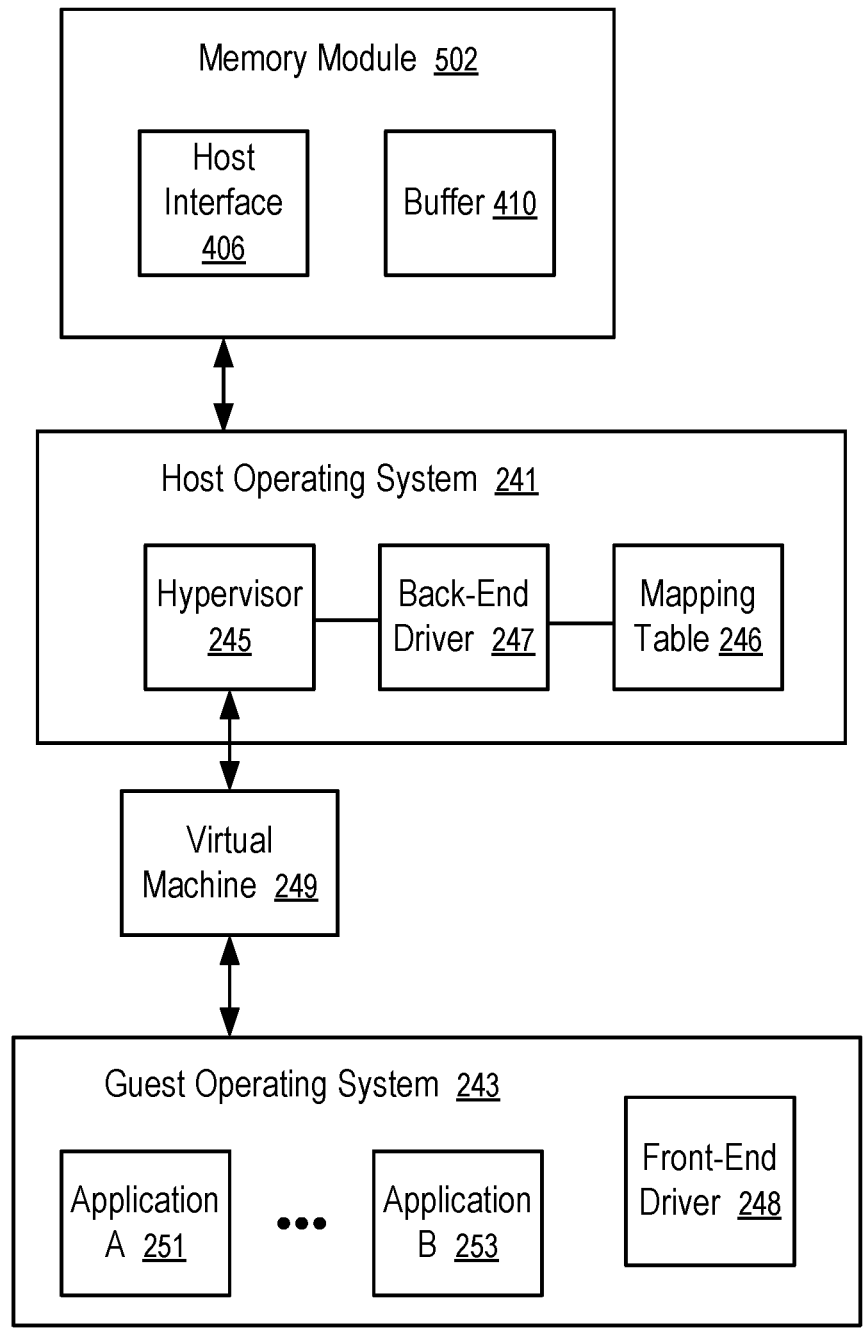
FIG. 5 shows a host operating system accessing a memory module using memory bus access, in accordance with at least some embodiments.

FIG. 5 shows a host operating system 241 accessing a memory module 502 using a memory bus, in accordance with at least some embodiments. Memory module 502 includes a buffer 410. Buffer 410 is an example of buffer 121. In one example, buffer 410 stores metadata 322 and/or at least a portion of page table 328. Commands and data are received from a host operating system 241 via host interface 406. In one example, host operating system 241 executes on computer system 120 or 300.

In one embodiment, a device driver 247 (e.g., a back-end driver) is configured for memory access via a hypervisor 245. In one example, the system of FIG. 5 is implemented in a computer system of FIGS. 1-3.

In one example, the host operating system 241 runs on the processing device 118 of the computer system of FIG. 1 or 2, or processing device 310 of FIG. 3. The host operating system 241 includes one or more device drivers (e.g., 247) that provide memory services using the memory (e.g., 221, . . . , 223) of memory sub-systems, such as the memory module 205 or memory sub-system 302.

In one embodiment, back-end driver 247 maintains a mapping table 246. For example, the driver 247 maintains mapping table 246 to include a mapping for pages of data stored in DRAM 304, NVRAM 306, and NAND flash 308.

In one embodiment, the host operating system 241 includes a hypervisor 245 that provisions a virtual machine 249. The virtual machine 249 has virtual hardware implemented via the resources and services provided by the host operating system 241 using the hardware of a computing system of FIGS. 1-3. For example, the hypervisor 245 can provision virtual memory as part of the virtual machine 249 using a portion of the memory (e.g., 221, . . . , 223) of memory sub-systems, such as the memory module 205.

The virtual machine 249 allows a guest operating system 243 to provide resources and/or services to applications (e.g., 251, . . . , 253) running in the guest operating system 243, in a way as the operating system 243 running on a physical computing machine that has the same or similar set of hardware as provisioning in the virtual machine. The hypervisor 245 manages the mapping between the virtual hardware provisioned in the virtual machine and the services of hardware in the computing system managed by the host operating system 241.

A device driver 248 (e.g., a front-end driver) communicates with back-end driver 247. Driver 247 and driver 248 can communicate for memory ballooning when additional DDR capacity (e.g., capacity in DRAM or NVRAM) is available.

FIG. 5 illustrates an instance in which a virtual machine 249 is provisioned by the hypervisor 245. In general, the hypervisor 245 can provision several virtual machines (e.g., 249) that can run the same guest operating system 243, or different guest operating systems. Different sets of users and/or application programs can be assigned to use different virtual machines.

In some instances, the host operating system 241 is specialized to provide services for the provisioning of virtual machines and does not run other application programs. Alternatively, the host operating system 241 can provide additional services to support other application programs, such as applications (e.g., 251, . . . , 253).

In one embodiment, the device driver 247 can be configured to request page-in of a page from slower memory (e.g., NVRAM) to faster memory (e.g., DRAM) for use by the virtual machine 249. This request can be made in response to a request from an application (e.g., application 312 of FIG. 3). After requesting the page, the page is made available in the faster memory by loading and/or transferring the page of data from the slower memory to the faster memory. In one example, processing device 310 moves the page from slower memory to faster memory based on address range information stored as metadata 320, 322. In one example, the slower memory can be the non-volatile memory 404 in the memory module 401 and the faster memory be the volatile memory 402 in the same memory module 401.

In one embodiment, the transfer of data (e.g., performed in response to a page-in request by the host operating system 241) is performed within a same memory sub-system, such as within the same memory module 401, to avoid or reduce congestion in communication channels connected to the processing device 118, such as the memory bus 203. For example, data can be copied from the slower memory 223 (e.g., NVRAM or NAND flash) in the memory module 205 to the faster memory 221 (e.g., DRAM) in the memory module 205, under the control of controller 227 in the memory module 205 in response to one or more commands, requests, and/or instructions from the device driver 247.

In one embodiment, the hypervisor 245 not only requests the device driver 247 to access a memory (e.g., 221, . . . , 223) in a memory sub-system (e.g., memory module 205), but also provides the device driver 247 with information that can be used in managing pages in the memory (e.g., 221, . . . , 223) to be used. In one example, the provided information includes stored metadata 320 or 322.

In one example, driver 247 is a memory mode driver used to access a memory address space in memory module 502 (e.g., a DIMM). Driver 247 has control over which pages are in volatile memory of the DIMM at any one time. In one approach, for example, the memory address space is exposed to the guest operating system 243. In this hypervisor environment, the guest operating system 243 sees the full storage capacity of the non-volatile memory (e.g., NVRAM and DRAM) in the DIMM.

In one example, only a number of pages that are in the DDR DRAM are actively paged-in via the host operating system 241. If there is a guest access to a page that is not present, a page fault path in a memory management unit (MMU) of the host system triggers the driver 247 to cause loading (page in) of a page. In one example, the page gets loaded in through control registers. Once the page is actually present in the DDR DRAM, then the driver 247 can set up MMU mapping (via mapping table 246) so that a guest application can directly read and write that data.

In one example, a front-end driver of a guest and a back-end driver of a host communicate regarding access to the memory address space. In one example, when deciding that pages are stale (e.g., not being used frequently based on a predetermined threshold), a request is made that a portion of data that is currently mapped in the DDR memory address space be pushed back out to the NVRAM memory (e.g., via an SRAM buffer) to make space available in the DRAM memory for other pages to be paged in. The back-end driver 247 communicates the page out request to move data from the DDR DRAM to the NVRAM memory.

In one embodiment, back-end driver 247 operates as a memory mode driver. Until driver 247 loads, there is no access to the NVRAM memory capacity of memory module 502. During this operation as a memory mode driver, the guest operating system 243 sees the memory as normal, and the driver 247 reserves DRAM pages on the memory module for page-in and page-out operations.

The driver 247 exposes the NVRAM memory to the guest operating system 243 and maintains the page mapping (e.g., in mapping table 246). For example, the driver 247 maintains the mapping between pages that are currently in the DRAM and pages that are on the NVRAM memory.

In one example, the driver 247 sets up memory management unit mapping tables at the host system to map any pages that are currently stored in DRAM. A page fault path from the guest can be used if there is an access outside of a mapped page to trigger a page-in request. A page-out request can be performed to maintain some memory space in the DRAM.

In one embodiment, operation is not restricted to memory mode. Driver 247 can also be operated as a block mode driver for which NVRAM memory is exposed as block mode storage.

In one embodiment, the memory module 502 maintains its own mapping table including a list of pages that are in an SRAM buffer (not shown). These permit reducing the latency for the host system to access those particular page(s). The driver 247 ensures that until its mapping is set up, the host will not access that page(s) until the page-in request completes.

In one embodiment, driver 247 implements a page out operation. In one example, this operation is triggered as a thread. This operation trades free pages back out of the DRAM memory and changes the mapping of valid pages.

Figure 6:
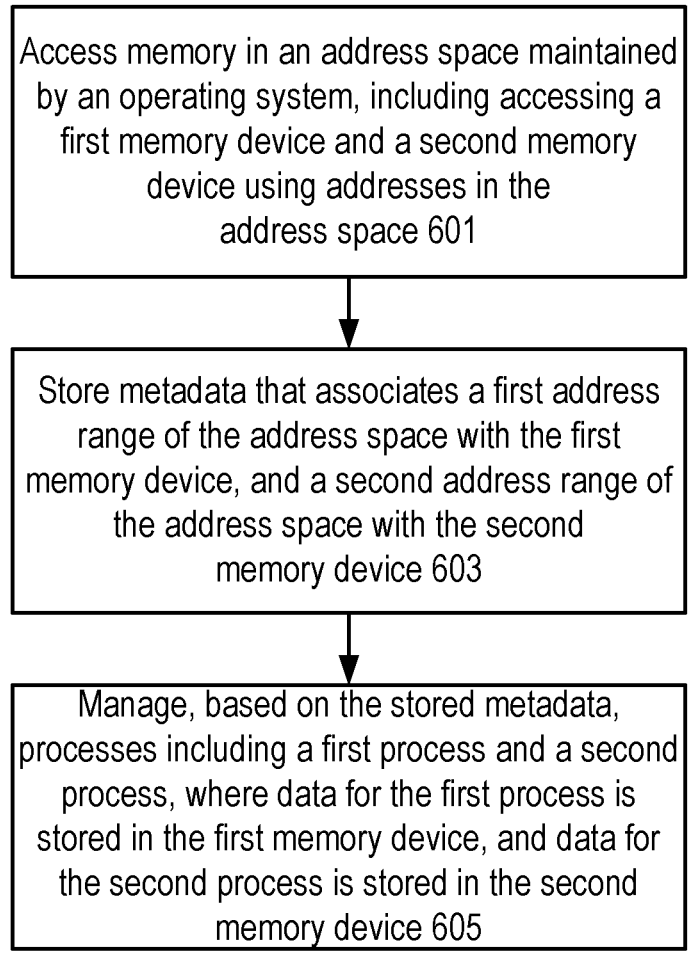
FIG. 6 shows a method for managing memory for processes in an address space of a computer system based on stored metadata that associates virtual address ranges for the processes in the address space with physical addresses for memory devices in the computer system, in accordance with some embodiments.

FIG. 6 shows a method for managing memory for processes in an address space of a computer system based on stored metadata that associates virtual address ranges for the processes in the address space with physical addresses for memory devices in the computer system, in accordance with some embodiments. For example, the method of FIG. 6 can be implemented in the system of FIGS. 1-3.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., processing device 310 of FIG. 3).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, an operating system maintains memory in an address space. The memory is accessed including accessing a first memory device and a second memory device using addresses in the address space. In one example, the operating system executes on processing device 310 of FIG. 3. In one example, the first memory device is DRAM 304, and the second memory device is NVRAM 306. In one example, the first memory device is NVRAM 306, and the second memory device is NAND flash 308.

At block 603, metadata is stored that associates a first address range of the address space with the first memory device. The metadata also associates a second address range of the address space with the second memory device. In one example, the stored metadata is metadata 320 and/or 322 of FIG. 3. In one example, the first address range is address range 324, and the second address range is address range 326.

At block 605, processes running in a computer system are managed based on the stored metadata. The processes include a first process and a second process. Data for the first process is stored in the first memory device, and data for the second process is stored in the second memory device. In one example, data for the first process is stored in address range 324, and data for the second process is stored in address range 326. In one example, data for the first process is stored in an address range of metadata 320, 322 that corresponds to physical memory storage in DRAM 304. In one example, the computer system is computer system 120 or 300.

In one embodiment, a method comprises: accessing, by a processing device (e.g., processing device 310 of FIG. 3) of a computer system, memory in an address space, wherein memory devices of the computer system are accessed by the processing device using addresses in the address space; storing metadata (e.g., metadata 320 and/or 322) that associates a first address range of the address space with a first memory device (e.g., DRAM 304), and a second address range of the address space with a second memory device (e.g., NVRAM 306), wherein a first latency of the first memory device is different from a second latency of the second memory device; and allocating, based on the stored metadata, the first address range to an application (e.g., application 312) executing on the computer system.

In one embodiment, allocating the first address range to the application is performed in response to a request by the application.

In one embodiment, the method further comprises: in response to a first request by the application, providing an indication that the first latency is greater than the second latency; receiving a second request made by the application based on the indication; and in response to receiving the second request, allocating the second address range to the application.

In one embodiment, the first latency is less than the second latency, and the metadata is stored in the first memory device.

In one embodiment, the computer system uses a memory bus to access the first memory device and the second memory device, and wherein the metadata is stored in the second memory device.

In one embodiment, the metadata is stored in the first memory device, and the method further comprises loading at least a portion of the metadata into a buffer (e.g., translation lookaside buffer 318), wherein the processing device queries the buffer to determine a physical address corresponding to a virtual address in the first address range.

In one embodiment, the computer system is a system-on-chip device, and the buffer is a translation lookaside buffer.

In one embodiment, the method further comprises: providing, to the application, memory characteristics of the first memory device and the second memory device; wherein allocating the first address range to the application is in response to a request made by the application based on the provided memory characteristics.

In one embodiment, the method further comprises receiving a requested latency from the application, wherein allocating the first address range to the application is further based on the requested latency.

In one embodiment, the method further comprises determining a priority associated with the application, wherein allocating the first address range to the application is further based on the priority.

In one embodiment, the first latency is less than the second latency; prior to allocating the first address range to the application, the application is allocated to the second address range; and allocating the first address range to the application is performed in response to determining an increase in a priority associated with the application.

In one embodiment, determining the increase in the priority associated with the application is based on one or more observations regarding data access by the application in the address space.

In one embodiment, the method further comprises determining, by the processing device, latencies associated with the memory devices, wherein storing the metadata further comprises storing the determined latencies.

In one embodiment, a system comprises: a first memory device; a second memory device; at least one processing device; and memory containing instructions configured to instruct the at least one processing device to: access memory in an address space maintained by an operating system, the accessing including accessing the first memory device and the second memory device using addresses in the address space; store metadata that associates a first address range of the address space with the first memory device, and a second address range of the address space with the second memory device; and manage, by the operating system based on the stored metadata, processes including a first process and a second process, wherein data for the first process is stored in the first memory device, and data for the second process is stored in the second memory device.

In one embodiment, the first process has a first priority, the second process has a second priority, and the first memory device is selected to store the data for the first process in response to determining that the first priority is higher than the second priority.

In one embodiment, the first process corresponds to a first application; the instructions are further configured to instruct the at least one processing device to receive a request from the first application that indicates a type of memory to use for storing data; and the first memory device is selected to store the data for the first process based on the indicated type of memory.

In one embodiment, the system further comprises a buffer to store the metadata, wherein the operating system receives a virtual address in the first address range from the first process, and accesses the buffer to determine a physical address of the first memory device corresponding to the virtual address.

In one embodiment, a read latency of the first memory device is less than a read latency of the second memory device, and the instructions are further configured to instruct the at least one processing device to store the metadata in the first memory device.

In one embodiment, the system further comprises a memory management unit (e.g., memory management unit 316) configured to, when accessing the stored data for the first process, map a virtual address in the first address range to a physical address in the first memory device.

In one embodiment, a non-transitory machine-readable storage medium stores instructions which, when executed on at least one processing device, cause the at least one processing device to at least: access memory in an address space, wherein memory devices of a computer system are accessed by the at least one processing device using addresses in the address space; store metadata that associates a first address range of the address space with a first memory device, and a second address range of the address space with a second memory device; provide, to an application executing on the computer system, first data indicating that a first latency of the first memory device is less than a second latency of the second memory device; in response to providing the first data to the application, receive a request from the application that second data associated with the application be stored in the first memory device; in response to a request by the application to store the second data, query the stored metadata to provide a result; and store, based on the result, the second data in the first memory device.

Figure 7:
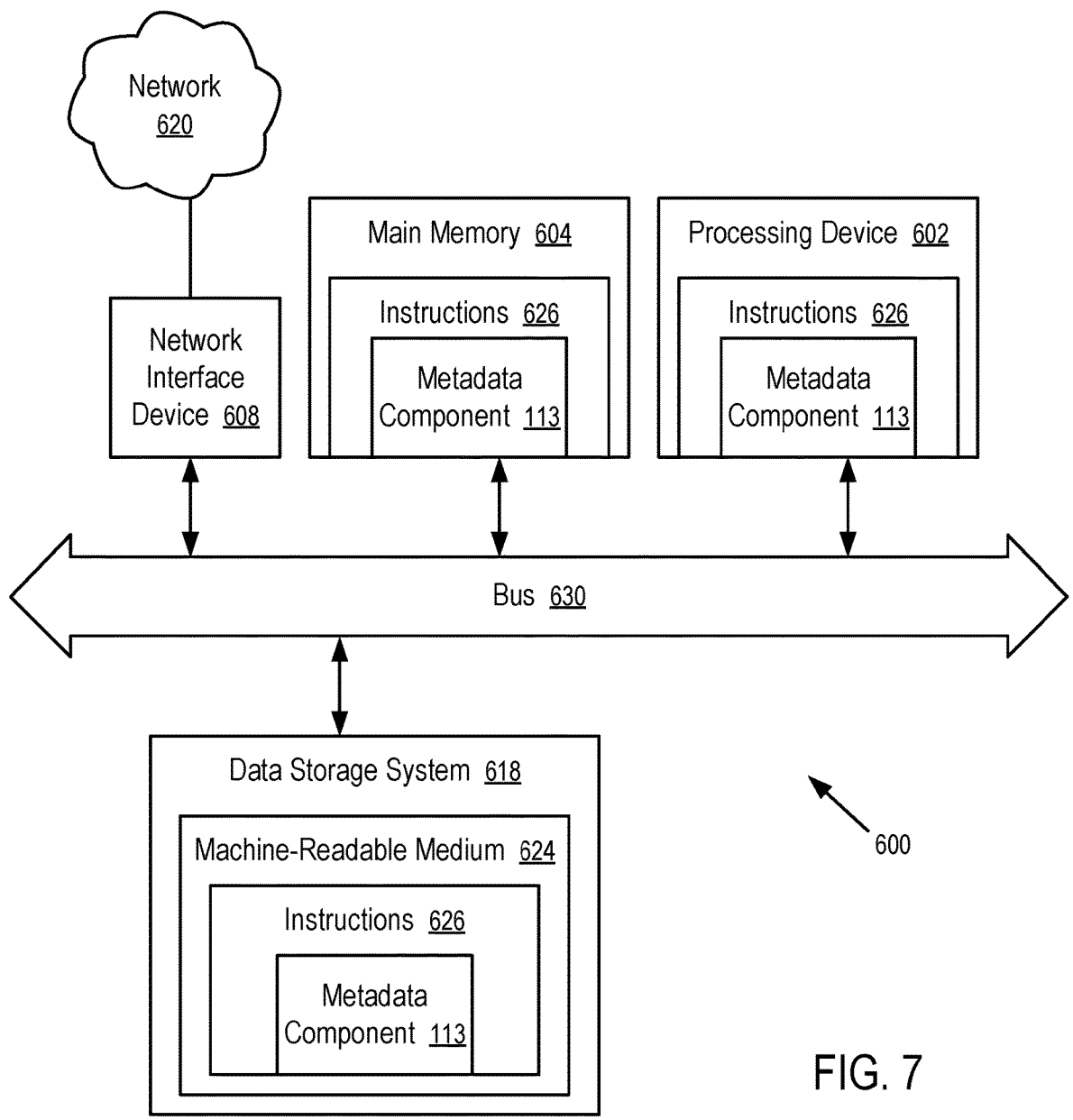
FIG. 7 is a block diagram of an example computer system in which embodiments of the present disclosure can operate.

FIG. 7 is a block diagram of an example computer system in which embodiments of the present disclosure can operate. FIG. 7 illustrates an example machine of a computer system 600 within which a set of instructions, for causing the machine to perform any one or more of the methodologies discussed herein, can be executed. In some embodiments, the computer system 600 can correspond to a host system (e.g., the computer system 120 of FIG. 1) that includes, is coupled to, or utilizes a memory sub-system (e.g., the memory sub-system 110 of FIG. 1) or can be used to perform the operations of a metadata component 113 (e.g., to execute instructions to perform operations corresponding to the metadata component 113 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, an Internet of Things (IOT) device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a metadata component 113 (e.g., the metadata component 113 described with reference to FIGS. 1-6). While the machine-readable storage medium 624 is shown in an example embodiment to be a single medium, the term "machine-readable storage medium" should be taken to include a single medium or multiple media that store the one or more sets of instructions.

Page Table Hooks to Memory Types

Various embodiments related to page table entries that map virtual addresses of virtual pages to physical addresses in memory devices of different memory types are now described below. The generality of the following description is not limited by the various embodiments described above.

In prior memory management units of computer systems that use different types of physical memory devices for storing data, a technical problem exists in which the MMU is not aware of how memory for various virtual pages is physically mapped to different types of memory devices (e.g., whether a virtual page is mapped to physical addresses in DRAM vs. NVRAM or flash memory). For example, the MMU does not store data regarding how each virtual page is mapped to different types of memory devices. In addition, memory type ignorance is just one limitation. Different physical addresses may have differences in access characteristics (of which the MMU is unaware) even in a homogenous memory system (e.g., in a NUMA architecture).

In one example, if the virtual page for a process is mapped to physical memory devices (e.g., flash memory) that are significantly slower than other memory devices (e.g., DRAM), then the process can be forced to run slowly due to an inability to rapidly access data. For example, the process may need a virtual page from main memory in order to continue processing. If the needed virtual page is actually stored in a slow physical memory device, then the process is significantly delayed while waiting for access to the virtual page.

Various embodiments described below provide a technological solution to one or more of the above technical problems. In one embodiment, a method includes: associating, by at least one processing device (e.g., a CPU and/or MMU), a virtual page with a first memory type; generating a page table entry to map a virtual address of the virtual page to a physical address in a first memory device of the first memory type; and storing, using the page table entry, the virtual page at the physical address in the first memory device. In one example, the page table entry has been copied to a cache of a memory management unit and/or microprocessor. In one example, the page table entry has been copied to a translation lookaside buffer (TLB) that is used by a memory management unit when storing virtual pages in main memory of a central processing unit.

In one embodiment, an operating system of a mobile device manages the location of a virtual page associated with a memory type. For example, the memory type can be DRAM, NVRAM, or NAND flash. When the virtual page is associated with a particular memory type, the operating system generates the page table entry to map the logical address of the virtual page to the corresponding memory type. The processor can request a memory page to be transferred to a different type of memory by changing its memory type.

In one example, an application or other software executing on a computing device has provided information to the operating system that identifies a memory type that the application or other software desires to use for processing. In response, the operating system associates one or more virtual pages of the application or software with a physical memory device that corresponds to the identified memory type requested by the application or software. For example, in response to a request by the application for an NVRAM memory type, virtual pages are allocated to the application. The physical addresses corresponding to the allocated virtual pages are used to store data in an NVRAM device (e.g., a cross point memory device).

Figure 8:
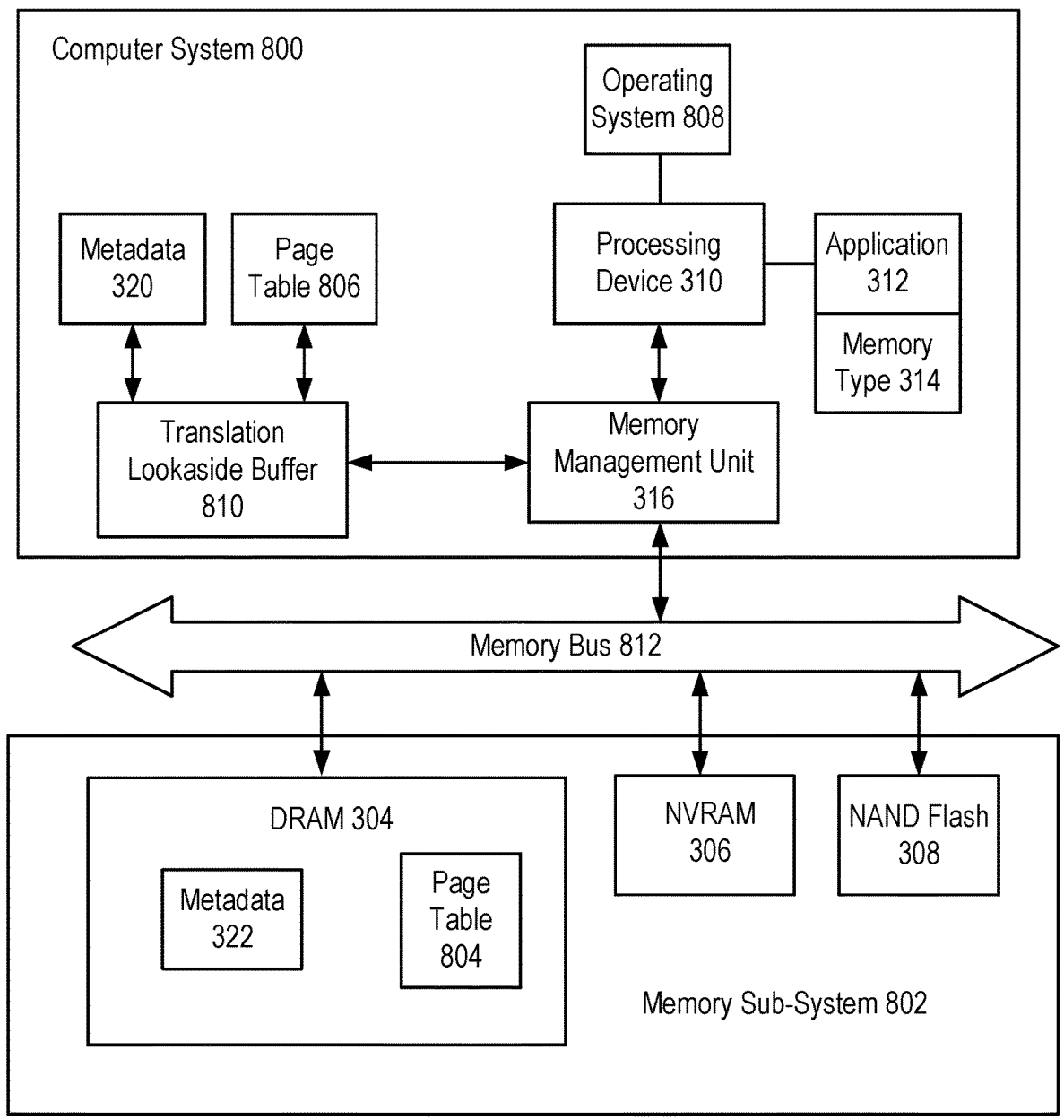
FIG. 8 illustrates an example computer system that uses one or more page tables to access memory devices on a memory bus, in accordance with some embodiments.

FIG. 8 illustrates an example computer system 800 that uses one or more page tables 804, 806 to access memory devices on a memory bus 812, in accordance with some embodiments. The memory devices can include DRAM 304, NVRAM 306, and NAND flash 308 of a memory sub-system 802.

Computer system 800 is an example of computer system 300 of FIG. 3. Memory sub-system 802 is an example of memory sub-system 302 of FIG. 3. Memory bus 812 is an example of memory bus 203 of FIG. 2.

An operating system 808 runs on processing device 310. Operating system 808 allocates main memory of processing device 310 to various applications. These applications include application 312, which has a memory type 314. In one example, memory type 314 is embedded in the code of application 312. In one example, memory type 314 is provided to processing device 310 by a different computing device (not shown). In one example, the different computing device is a server that provides memory type 314 in association with a request by application 312 for a memory allocation.

Operating system 808 manages memory for computer system 800 using memory management unit (MMU) 316. In one embodiment, virtual pages associated with applications including application 312 are mapped to physical memory that resides in memory sub-system 802. MMU 316 accesses page table entries to determine physical addresses in memory that correspond to virtual pages that an application needs to access.

The page table entries can be stored in page table 804 and/or page table 806. In one example, MMU 316 queries the page table 804, 806 by providing a virtual address that corresponds to a virtual page. A result from the query is a physical address of a memory device (e.g., DRAM 304).

In one embodiment, page table 804 is stored in DRAM 304. In one embodiment, page table 806 is stored in memory of computer system 800. In one example, MMU 316 accesses page table 804 when a page table entry is not present in computer system 800. In one example, page table entries are split between page table 804 and page table 806.

In one example, page table entries in page table 806 correspond to processes that have a higher priority. In one example, processing device 310 assigns a priority to a process that corresponds to an application based on a memory type received by processing device 310 that corresponds to the application.

In one embodiment, MMU 316 uses both page table 804 and metadata 322 for memory management. In one example, the MMU 316 uses metadata 322 to select a memory device for storing data corresponding to a virtual page. The selected memory device can correspond to a requested memory type (e.g., memory type 314). In another embodiment, MMU 316 uses both page table 806 and metadata 320 for memory management.

In one embodiment, some of the page table entries from page table 804, 806 are copied to a translation lookaside buffer (TLB) 810. When mapping a virtual address to a physical address, MMU 316 first checks TLB 810 for a page table entry that corresponds to the virtual address. The page table entries in TLB 810 can also include data copied from metadata 320, 322.

In one embodiment, application 312 requests an allocation of memory by processing device 310. In response, operating system 808 uses MMU 316 to generate a page table entry to map a virtual address of a virtual page for application 312 to a physical address in a memory device. The memory device is selected to be of memory type 314. In one embodiment, metadata 322 is used to select the memory device. In one embodiment, after generating the page table entry, a copy of the page table entry is stored in TLB 810 and/or metadata 320, 322 is updated.

In one embodiment, processing device 310 determines a change associated with application 312. In one example, the change is a change in a priority of one or more functions performed by application 312. In one example, the change is a change in a context associated with application 312, such as a security context, etc.

In response to determining the change, operating system 808 associates one or more virtual pages of application 312 with a new memory type. For example, the memory type for application 312 can be changed from NVRAM to DRAM in response to determining a higher priority for application 312. In response to the change to the new memory type, page table entries are updated to map the virtual addresses of virtual pages to physical addresses in a new memory device of the new memory type. Then, MMU 316 uses the updated page table entries to transfer the virtual pages from the currently-used memory device to the new memory device.

In one embodiment, computer system 800 and/or processing device 310 is a system on a chip (SoC). In one example, the SoC can be or include an integrated circuit or chip that integrates any two or more components of a computing device. The two or more components can include at least one or more of a central processing unit (CPU), graphics processing unit (GPU), memory, input/output ports, and secondary storage. For example, an SoC can include a CPU, a GPU, graphics and memory interfaces, hard-disk, USB connectivity, random-access memory, read-only memory, secondary storage, or any combination thereof on a single circuit die. Also, where a processor chip is an SoC, the SoC can include at least a CPU and/or a GPU.

In one example of an SoC, the two or more components can be embedded on a single substrate or microchip (chip). In general, an SoC is different from a conventional motherboard-based architecture in that the SoC integrates all of its components into a single integrated circuit; whereas a motherboard houses and connects detachable or replaceable components. Because the two or more components are integrated on a single substrate or chip, SoCs consume less power and take up much less area than multi-chip designs with equivalent functionality. In some embodiments, memory systems or sub-systems described herein can be connected with or be a part of SoCs in mobile computing devices (such as in smartphones), embedded systems, and Internet of Things (IoT) devices. In one embodiment, memory sub-system 802 can be or be included in an SoC. Also, where the memory sub-system 802 is an SoC, the SoC can include at least a data processing unit.

FIG. 9 illustrates an example page table 900 having page table entries 902, 904, in accordance with some embodiments. Each page table entry 902, 904 includes a virtual address, a corresponding physical address, and a memory type. In one example, the memory type is memory type 314. In one example, memory type 314 is used to update the page table entry in response to a new allocation, or change in allocation, of main memory to a process. In various embodiments, each entry 902, 904 may further include a process identifier, usage data, and/or a memory device identifier. Page table 900 is an example of page table 804 or 806.

In one embodiment, for each page table entry, the virtual address corresponds to a virtual page of an application such as application 312. The physical address corresponds to a location in a memory device of memory sub-system 802. The memory type corresponds to the type of memory device at the physical address.

In one embodiment, the process identifier for each page table entry is used to identify a process executing on processing device 310 that is using a virtual page at the virtual address. For example, the process identifier is a unique identifier for each process running in computer system 800.

In one embodiment, the usage data for each page table entry can correspond to data regarding access or other usage associated with data stored in a virtual page at the virtual address of the page table entry. In one example, the usage data relates to a pattern of usage of the virtual page. In one example, the pattern of usage is a frequency of access to data in the virtual page. In one example, the frequency of access can be for read and/or write access. In one example, the usage data relates to a time of last use of data in the virtual page.

In one embodiment, each page table entry can include a memory device identifier. In one example, the memory device identifier uniquely identifies the physical memory device in which data corresponding to the virtual address is stored. In one example, the memory device identifier uniquely corresponds to DRAM 304 or NVRAM 306.

In one embodiment, each page table entry can further include at least a portion of metadata 320 and/or 322. In one example, the included metadata can be an address range for a physical memory device.

Figure 10:
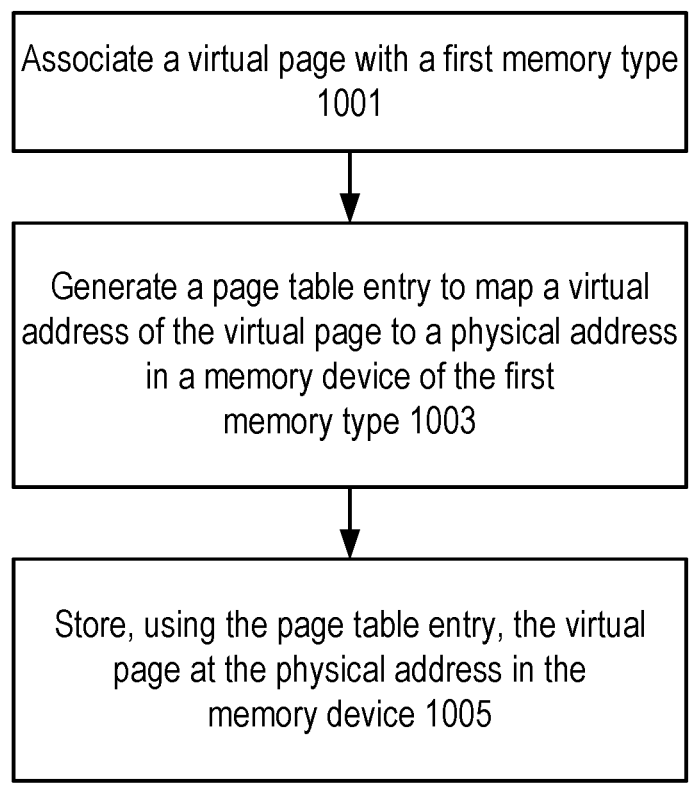
FIG. 10 shows a method for generating page table entries to map virtual addresses of virtual pages to physical addresses in memory devices of different memory types, in accordance with some embodiments.

FIG. 10 shows a method for generating page table entries to map virtual addresses of virtual pages to physical addresses in memory devices of different memory types, in accordance with some embodiments. For example, the method of FIG. 10 can be implemented in the system of FIG. 8, or the computer system 600 of FIG. 7.

The method of FIG. 10 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 10 is performed at least in part by one or more processing devices (e.g., processing device 310 of FIG. 8).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1001, a virtual page is associated with a first memory type. In one example, the first memory type is DRAM, NVRAM, or flash memory. In one example, the virtual page corresponds to application 312. In one example, the virtual page corresponds to memory allocated to application 312 in response to a request for an allocation of main memory used by processing device 310.

At block 1003, a page table entry is generated. The page table entry maps a virtual address of the virtual page to a physical address in a memory device of the first memory type. In one example, the page table entry resides in page table 804 or 806. In one example, the memory device is DRAM 304, NVRAM 306, or NAND flash 308.

At block 1005, using the page table entry, the virtual page is stored at the physical address in the memory device. In one example, memory management unit 316 stores a virtual page using a page table entry cached in translation lookaside buffer 810.

In one embodiment, a method comprises: associating, by at least one processing device (e.g., processing device 310 and/or memory management unit 316), a virtual page with a first memory type; generating a page table entry (e.g., page table entry 902) to map a virtual address of the virtual page to a physical address in a first memory device (e.g., DRAM 304) of the first memory type; and storing, using the page table entry, the virtual page at the physical address in the first memory device.

In one embodiment, the method further comprises: associating, by the at least one processing device, the virtual page with a second memory type; updating the page table entry to map the virtual address of the virtual page to a physical address in a second memory device (e.g., NVRAM 306) of the second memory type; and transferring, using the updated page table entry, the virtual page from the first memory device to the second memory device.

In one embodiment, an operating system (e.g., operating system 808) runs on the at least one processing device, and generating the page table entry is performed by the operating system in response to associating the virtual page with the first memory type.

In one embodiment, associating the virtual page with the first memory type is performed in response to a request received by an operating system from an application (e.g., application 312).

In one embodiment, the first memory type (e.g., memory type 314) is provided with the request from the application.

In one embodiment, the method further comprises managing, by an operating system of a computing device, physical locations for virtual pages stored in memory devices, wherein the memory devices include the first memory device and a second memory device of a second memory type, and wherein a latency of the first memory device is less than a latency of the second memory device.

In one embodiment, differences other than and/or in addition to latency may exist between first and second memory devices. In one example, power and/or performance characteristics of the first memory device are different from the second memory device, which has a lower-power memory and/or a more durable memory. Examples of differences in memory characteristics between different memory devices or types or memory can include performance, power, durability, error rate, and/or combinations thereof. In some cases, for example, these differences may exist between devices of the same memory type (e.g., error rate varies for different chips of the same memory type that are used to store data for a process).

In one embodiment, the first memory type is dynamic random access memory, and the second memory type is non-volatile random access memory or flash memory.

In one embodiment, the method further comprises: monitoring, by an operating system, an application running on the at least one processing device; and updating, based on the monitoring, the page table entry to map the virtual address of the virtual page to a physical address in a second memory device of a second memory type.

In one embodiment, the method further comprises: determining a context of operation associated with the at least one processing device; selecting, based on the determined context, a second memory type; and in response to selecting the second memory type, updating the page table entry to map the virtual address of the virtual page to a physical address in a second memory device of the second memory type.

In one embodiment, the method further comprises: associating, by the at least one processing device, the virtual page with a second memory type; in response to associating the virtual page with the second memory type, updating mapping data in a translation lookaside buffer (e.g., TLB 810); and transferring, by a memory management unit based on accessing the updated mapping data in the translation lookaside buffer, the virtual page from the first memory device to a second memory device.

In one embodiment, processes are executing on the at least one processing device, and the page table entry comprises a process identifier for a first process that uses the virtual page.

In one embodiment, the page table entry comprises data regarding a pattern of usage by one or more applications running on the at least one processing device.

In one embodiment, the data regarding the pattern of usage is at least one of a frequency of use or a time of last use.

In one embodiment, a system comprises: a first memory device; a page table storing page table entries that map virtual addresses to physical addresses in memory devices of different memory types, the memory devices including the first memory device; at least one processing device; and memory containing instructions configured to instruct the at least one processing device to: determine an association of a virtual page to a first memory type; determine that the first memory device corresponds to the first memory type; and generate a page table entry to map a virtual address of the virtual page to a first physical address of the first memory device.

In one embodiment, the at least one processing device uses main memory having data stored on the memory devices, and determining the association of the virtual page to the first memory type is performed in response to a request by an application for an allocation of the main memory.

In one embodiment, the instructions are further configured to instruct the at least one processing device to: store metadata (e.g., metadata 320, 322) that associates address ranges in main memory to physical addresses in the memory devices; wherein determining that the first memory device corresponds to the first memory type is based on the stored metadata.

In one embodiment, the instructions are further configured to instruct the at least one processing device to store, using the page table entry, the virtual page at the first physical address in the first memory device.

In one embodiment, the system further comprises a memory management unit (e.g., memory management unit 316) and a translation lookaside buffer, wherein the instructions are further configured to instruct the at least one processing device to: update mapping data in the translation lookaside buffer based on a change in memory type associated with the virtual page from the first memory type to a second memory type; and transfer, by the memory management unit based on the updated mapping data, the virtual page from the first memory device to a second memory device of the second memory type.

In one embodiment, the change in memory type is performed in response to a request by an application executing on the at least one processing device, or in response to a determination by the at least one processing device that a priority of a process or application has changed.

In one embodiment, a non-transitory machine-readable storage medium stores instructions which, when executed on at least one processing device, cause the at least one processing device to at least: associate a virtual page with a first memory type; generate a page table entry to map a virtual address of the virtual page to a physical address in a first memory device of the first memory type; and store, using the page table entry, the virtual page at the physical address in the first memory device.

Binding Data to a Namespace

Various embodiments related to binding data to a namespace in a memory system having physical memory of different memory types are now described below. The generality of the following description is not limited by the various embodiments described above.

In prior memory systems, main memory is made accessible to applications by an operating system and is allocated from a single logical address space (e.g., from a virtual address in the address space). In particular, the operating system does not make any mapping control accessible by the application, and thus the application cannot control what type of memory is used to store data. Instead, the operating system and/or the processor controls the mapping via a page table and a translation lookaside buffer. A page table defines the mapping between a page of logical address to a page of physical memory units in memory devices of a computer system. The total size of the page table is relatively large. Thus, most page tables are stored in memory (e.g., DRAM of main memory). A portion of data from the page tables that is currently being used to find the physical memory addresses is cached in the translation lookaside buffer of the processor/memory controller.

The foregoing situation for prior memory systems creates a technical problem in which certain data is not timely accessible by an application because the latency of the actual physical memory device storing the data is large. Thus, execution of the application can be held up for a long time period. In some cases, this delay can cause failure of a system that needs timely responses or other actions. For example, a real-time control system can fail due to slow data access from main memory. In one example, control of navigation for an autonomous vehicle can fail due to excessive latency for portions of main memory in which critical data is stored.

The inability of the application to control mapping of main memory usage to certain physical memory devices also prevents the application from selecting a memory having a higher reliability. This creates the technical problem in which critical data can be lost due to a functional failure of the memory (e.g., failure of data access from a physical memory device having a higher failure rate).

Various embodiments described below provide a technological solution to one or more of the above technical problems. In one embodiment, an application manages a mapping to physical memory devices used by an operating system for random memory access by specifying a memory type in which data is to be stored. The application allocates a portion of memory using the operating system (e.g., based on a request by the application to the operating system), and uses memory units of the specified memory type based on the memory addresses for the memory units. In one example, the operating system informs the application of a virtual memory address range that corresponds to the specified memory type.

In one embodiment, accessing data is performed by the operating system through a namespace table managed by the operating system. In one embodiment, the namespace table assigns names to memory addresses in main memory. In one embodiment, a name is assigned to a range of virtual addresses in an address space of main memory used by an application. In one embodiment, the namespaces are identified by namespace identifiers (e.g., using the arbitrary identifiers Namespace A, Namespace B, and Namespace C, where each identifier is associated with a different type of memory).

In one embodiment, namespaces are used for memory access. Each namespace is a named logical reference to a set of memory units in which memory addresses are defined. An application allocates memory from a namespace. The operating system provides a service which can be called by an application to bind and/or re-bind the namespace to a particular type of memory (e.g., DRAM, NVRAM, NAND flash). When the namespace is bound to a type of memory, the operating system adjusts one or more page tables to map the logical memory addresses in the namespace to the physical memory units of the particular memory type in the computer system. When the memory units are accessed via the logical addresses in the namespace, data from the one or more page tables is loaded and cached in the translation lookaside buffer of the processor/memory controller for the translation to physical memory addresses.

In one embodiment, namespaces are created in memory devices of different types (e.g., DRAM, NVRAM, and NAND flash). An application can dynamically change the binding between a set of data and a namespace to move the data to a desired memory device. In one embodiment, the operating system detects the change in binding and causes the data to be moved. In one embodiment, the operating system causes a memory management unit to update page tables so that the data is moved to the desired memory device from a currently-used memory device.

In one embodiment, data stored for random access as main memory is organized by various virtual address ranges. A set of virtual address ranges can be associated with a namespace identifier.

In one embodiment, a kernel of an operating system, with assistance from firmware and device drivers, controls all of the hardware devices in a computer system. The kernel manages memory access for programs in random access memory (RAM), and determines which programs get access to certain hardware resources.

The operating system provides an interface between an application program and the computer hardware of the computer system. The application program interacts with hardware based on procedures managed by the operating system. The operating system also provides services to application programs. When an application program is executed, the kernel of the operating system creates a process. The kernel assigns memory space and a priority for the process, loads program binary code into memory, and initiates execution of the application program.

In one embodiment, assignment of the memory space by the kernel is based at least in part on namespace data provided from the application. In one example, the application provides a namespace that corresponds to a memory type. In response, the kernel assigns memory space corresponding to a physical memory device of that memory type. In one example, the kernel uses virtual memory addressing (e.g., paging or segmentation) to determine the memory that each program can access at any given time.

Figure 11:
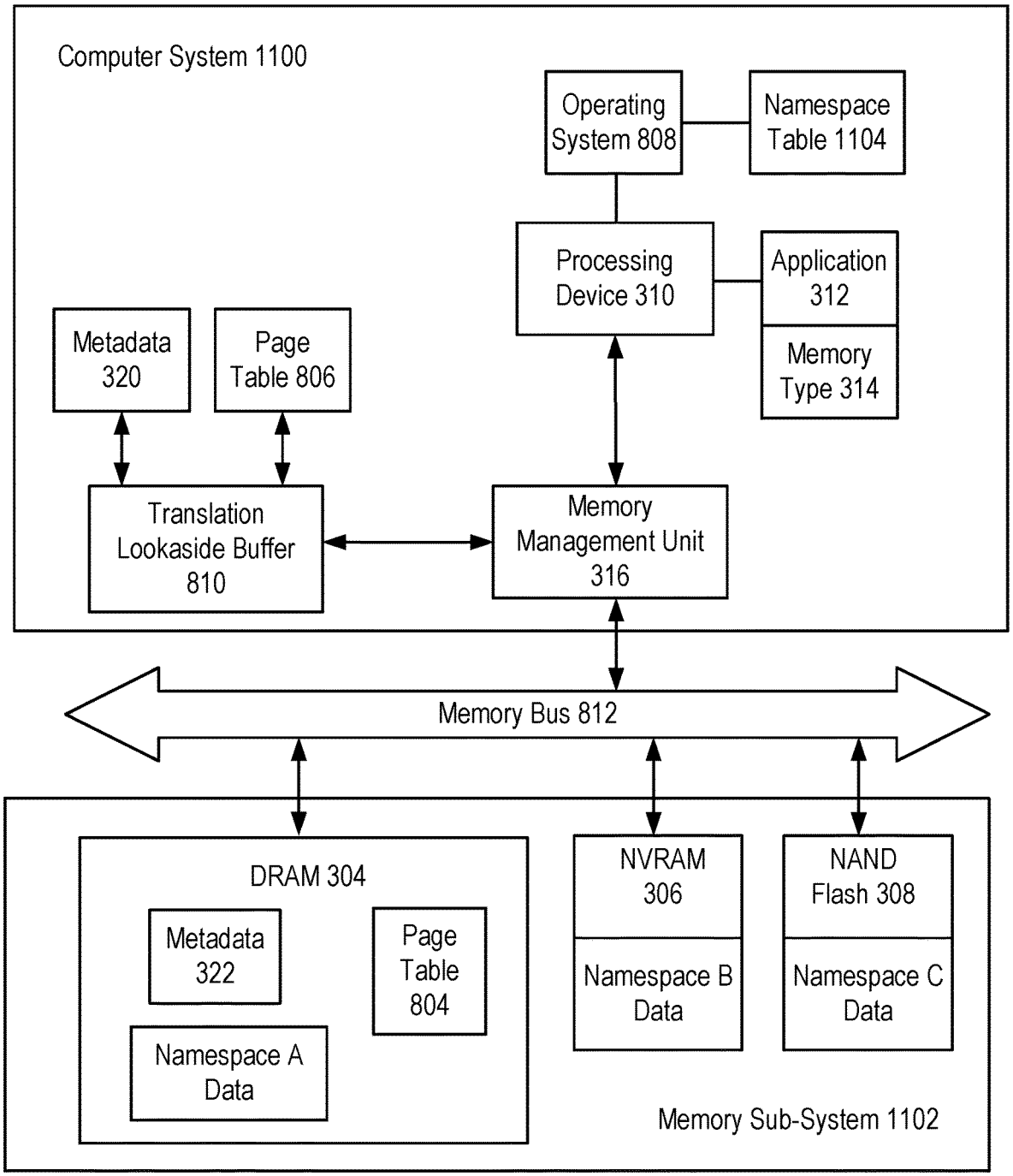
FIG. 11 illustrates an example computer system that uses a namespace table to map namespaces to different memory types for physical memory in the computer system, in accordance with some embodiments.

FIG. 11 illustrates an example computer system that uses a namespace table 1104 to map namespaces to different memory types for physical memory in the computer system, in accordance with some embodiments. The physical memory is used to provide random access memory accessible by a computer system 1100 over memory bus 812. Memory sub-system 1102 provides the physical memory that is used as random access memory and accessed by processing device 310 using memory management unit 316. In one example, computer system 1100 and memory sub-system 1102 are on the same integrated circuit (IC) chip or on different IC chips. In one example, computer system 1100 and memory sub-system 1102 are each part of the same system on a chip (SoC).

Computer system 1100 is an example of computer system 800 of FIG. 8. Memory sub-system 1102 is an example of memory sub-system 802 of FIG. 8.

The physical memory is provided by memory devices of different memory types including DRAM 304, NVRAM 306, and NAND flash 308. In other embodiments, various other types of memory and/or other combinations of memory types can be used.

Each memory device corresponds to a namespace identifier. For example, DRAM 304 corresponds to the identifier "Namespace A". NVRAM 306 corresponds to the identifier "Namespace B". NAND flash 308 corresponds to the identifier "Namespace C".

In one embodiment, each memory device can store various data associated with its assigned namespace. The respective namespace data is indicated in FIG. 11 as "Namespace A Data", "Namespace B Data", and "Namespace C Data". In one example, the namespace data includes the namespace identifier. In one example, the namespace data includes a physical address range corresponding to DRAM 304. In one example, the namespace data includes a portion of data from metadata 320, 322. In one example, the namespace data includes a portion of data from page table 804.

In one embodiment, namespace table 1104 is stored in memory of computer system 1100. Namespace table 1104 provides mappings between namespace identifiers and memory types. For example, the namespace identifier "Namespace A" is mapped to a memory type of DRAM.

In one embodiment, when application 312 makes a request to processing device 310 for an allocation of random access memory, operating system 808 creates a namespace identifier, and associates a memory type with the namespace identifier. Namespace table 1104 is updated to store this association. In one example, the memory type is memory type 314 as provided by application 312. In one example, operating system 808 determines the memory type based on a characteristic associated with application 312. In one example, operating system 808 determines a memory type based on a priority for application 312.

In one embodiment, application 312 provides a request to the operating system 808 that is related to memory management. The request includes a namespace identifier that is associated with or related to identified data. In response to receiving the request, operating system 808 accesses namespace table 1104 for performing one or more various actions or operations associated with the identified data. In one example, operating system 808 moves the identified data from an existing memory device of one memory type to a new memory device of another memory type that corresponds to the received namespace identifier. In one example, the operating system 808 performs one or more operations on the identified data and stores a result of the operations in a memory type associated with the namespace provided with the request. In one example, the operating system 808 provides a confirmation of completion of the action to the application 312.

In one embodiment, memory is allocated for use by application 312. The memory is allocated from a namespace. In one example, the namespace already exists in namespace table 1104. In another example, the namespace is created in response to a request for the memory allocation. The created namespace is stored in namespace table 1104.

The existing or newly-created namespace is bound to a memory type. In response to binding the namespace to the memory type, one or more page tables are adjusted to map a logical memory address and the namespace to a memory device of the memory type. In one example, page table 806 and/or page table 804 are updated in response to binding the namespace to the memory type.

In one embodiment, operating system 808 creates a namespace for a memory device. Data is bound to the namespace. In one example, the data is identified by a virtual address range. In response to binding the data to the namespace, the data is stored in the memory device associated with the created namespace. In one example, binding the data to the namespace includes storing a mapping between a virtual address of the namespace and a physical address of the memory device.

In one embodiment, one or more virtual addresses of the namespace correspond to a virtual page of a process managed by operating system 808 using page table 804. In one example, page table 804 includes a page table entry that maps the virtual addresses of the namespace to the physical address of the memory device.

FIG. 12 illustrates an example namespace table 1200 having records 1202, 1204, 1206 that map namespaces to different types of memory for a computer system, in accordance with some embodiments. In one example, the computer system is computer system 1100. Namespace table 1200 is an example of namespace table 1104.

Each record includes a namespace identifier (e.g., Namespace A) that is associated with a memory type (e.g., DRAM or NVRAM). In one example, a change in the memory type of record 1202 causes page table 900 to be updated so that page table entry 902 has a matching memory type.

Each record can further include a virtual address, a physical address, and/or a data identifier. In one example, the virtual address can be a virtual address range that corresponds to the memory type of the record. In one example, the physical address can be a physical address range that corresponds to one or more memory devices of the memory type of the record.

In one example, the data identifier identifies data that is associated with the namespace identifier. In one example, the data identifier is an address range in the address space of processing device 310. In one example, the data identifier is a physical address range for data stored in one or more memory devices of the memory type of the record.

In one embodiment, a portion of data from stored metadata 320, 322 is copied to a record in namespace table 1200. In one example, the portion of data is copied in response to a change in memory type that is associated with the namespace identifier of the record. In one example, the portion of data is copied in response to a change in the virtual address, physical address, and/or data identifier associated with the record.

Figure 13:
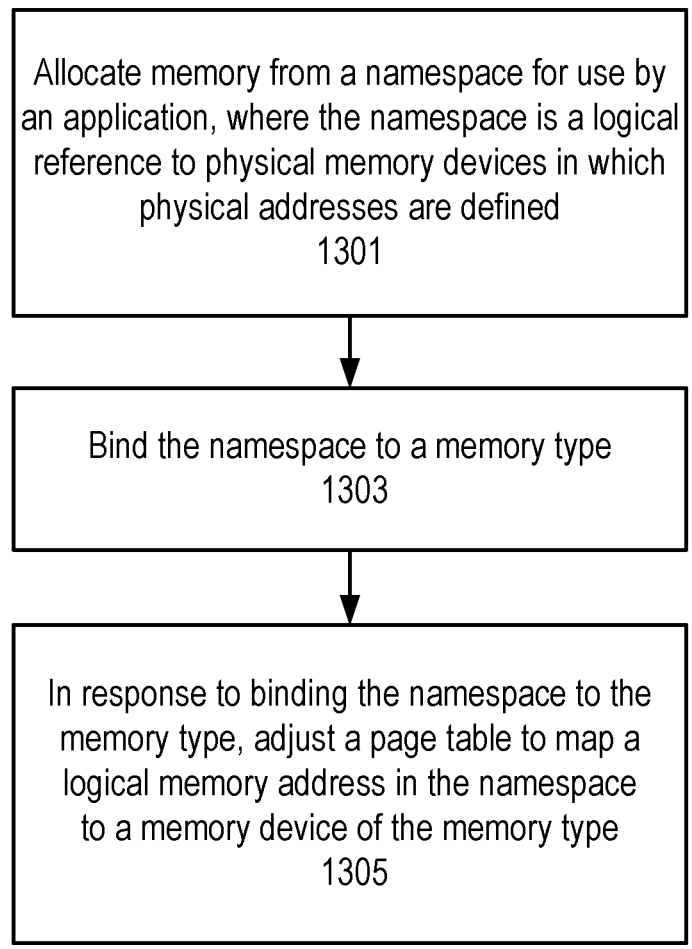
FIG. 13 shows a method for binding data to a namespace in a memory system having physical memory of different memory types, in accordance with some embodiments.

FIG. 13 shows a method for binding data to a namespace in a memory system having physical memory of different memory types, in accordance with some embodiments. For example, the method of FIG. 13 can be implemented in the system of FIG. 11.

The method of FIG. 13 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 13 is performed at least in part by one or more processing devices (e.g., processing device 310 of FIG. 11).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1301, memory is allocated from a namespace for use by an application. The namespace is a logical reference to one or more physical memory devices in which physical addresses are defined. In one example, the physical addresses are defined by operating system 808. In one example, the application is application 312.

At block 1303, the namespace is bound to a memory type. In one example, the namespace is bound to memory type 314. In one example, the binding of the namespace to the memory type is stored in namespace table 1104.

At block 1305, in response to binding the namespace to the memory type, a page table is adjusted to map a logical memory address in the namespace to a memory device of the memory type. In one example, page table 804 and/or page table 806 are adjusted. In one example, the logical memory address is a virtual address of a virtual page of application 312. In one example, the memory device is DRAM 304.

In one embodiment, a method comprises: creating, by at least one processing device (e.g., processing device 310 and/or memory management unit 316), namespaces for memory devices (e.g., DRAM 304, NVRAM 306, and NAND flash 308) of different memory types, the namespaces including a first namespace (e.g., "Namespace A") for a first memory device of a first memory type, and a second namespace (e.g., "Namespace B") for a second memory device of a second memory type; binding data to the first namespace (e.g., storing the binding in namespace table 1104); and in response to binding the data to the first namespace, storing the data in the first memory device.

In one embodiment, storing the data in the first memory device comprises moving the data from the second memory device to the first memory device.

In one embodiment, binding the data to the first namespace comprises a change in binding of the data from the second namespace to the first namespace.

In one embodiment, an operating system (e.g., operating system 808) is running on the at least one processing device, and binding the data to the first namespace is performed by the operating system in response to a request by an application (e.g., application 312).

In one embodiment, the first namespace is created by the operating system in response to a request by the application.

In one embodiment, creating the namespaces comprises associating a respective virtual address (e.g., a virtual address in page table 804, 806; a virtual address in metadata 320, 322) to each namespace.

In one embodiment, binding the data to the first namespace comprises storing a mapping between a virtual address (e.g., a virtual address in page table 804, 806; a virtual address in metadata 320, 322) of the first namespace and a first physical address of the first memory device.

In one embodiment, the virtual address of the first namespace is in a first address range of an address space of the at least one processing device, and wherein storing the mapping comprises storing metadata (e.g., metadata 320, 322) that associates the first address range with the first memory device.

In one embodiment, the virtual address of the first namespace corresponds to a virtual page of a process managed by an operating system using a page table (e.g., page table 804, 806), and wherein storing the mapping comprises generating a page table entry in the page table that maps the virtual address of the first namespace to the first physical address.

In one embodiment, the method further comprises storing, in a memory by an operating system, associations between namespaces and sets of data bound to the namespaces (e.g., a binding for a record in namespace table 1104).

In one embodiment, the method further comprises: determining an increase in a priority for an application executing on the at least one processing device; wherein binding the data to the first namespace is performed in response to determining the increase in the priority, wherein binding the data to the first namespace comprises a change in binding from the second namespace to the first namespace, and wherein a latency of the first memory device (e.g., DRAM 304) is less than a latency of the second memory device (e.g., NVRAM 306 or NAND flash 308).

In one embodiment, instead of determining an increase in priority that results in binding the data to the first namespace (in which the latency of the first memory device is less), a system can bind data to a namespace backed by, for example, a more-durable memory if a process is determined to be heavily write-intensive (e.g., exceeds a predetermined quantity and/or frequency of writes). In another example, a system can bind data to a namespace backed by a more-resilient memory if a process is determined to be mission critical (or by a less-resilient memory if a process is determined to be of less importance, or inconsequential).

In one embodiment, a process can be determined to have one or more certain characteristics (e.g., priority, consequence, interactivity, bandwidth/power consumption, etc.). Based on such determination, data associated with the process is bound to a namespace backed by memory with complementary characteristics that correspond to and/or are better suited to the determined one or more characteristics.

In one embodiment, creating the first namespace comprises storing an identification of the first namespace in memory of the first memory device (e.g., storing a namespace identifier and/or other identification as part of the "Namespace A Data" of FIG. 11).

In one embodiment, the method further comprises receiving, from an application, a request for an allocation of memory, wherein the request specifies that data be stored in physical memory of the first memory type (e.g., DRAM).

In one embodiment, a system comprises: a first memory device of a first memory type; at least one processing device; and memory containing instructions configured to instruct the at least one processing device to: allocate, by an operating system, memory from a namespace for use by an application, wherein the namespace is a logical reference to one or more physical memory devices in which physical addresses are defined; bind the namespace to the first memory type; and in response to binding the namespace to the first memory type, adjust, by the operating system, a page table to map a logical memory address in the namespace to the first memory device.

In one embodiment, the instructions are further configured to instruct the at least one processing device to access, using data from the page table, data at a first physical address in the first memory device that corresponds to the logical memory address in the namespace.

In one embodiment, the data from the page table is cached in a translation lookaside buffer (e.g., TLB 810), and a memory management unit (e.g., MMU 316) accesses the translation lookaside buffer to translate the logical memory address to the first physical address.

In one embodiment, the system further comprises a second memory device of a second memory type, wherein the instructions are further configured to instruct the at least one processing device to store, using data from the page table, data in the first memory device by moving the data from a second memory device of a second memory type to the first memory device.

In one embodiment, a non-transitory machine-readable storage medium stores instructions which, when executed on at least one processing device, cause the at least one processing device to at least: create namespaces for memory devices of different memory types, the namespaces including a first namespace for a first memory device of a first memory type, and a second namespace for a second memory device of a second memory type; bind data to the first namespace; and in response to binding the data to the first namespace, store the data in the first memory device.

In one embodiment, binding the data to the first namespace is performed in response to a request for the first memory type (e.g., memory type 314) received from an application; binding the data to the first namespace comprises a change in binding for the data from the second namespace to the first namespace; and a latency of the first memory device is less than a latency of the second memory device.

In one embodiment, binding the data to the first namespace comprises storing a mapping between a virtual address range of the first namespace and a first physical address of the first memory device; and storing the mapping comprises storing metadata (e.g., metadata 320, 322) that associates the virtual address range with the first memory device.

Closing

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

What is claimed is:

1. A system comprising:
a first memory device of a first memory type;
a second memory device of a second memory type;
at least one processing device; and
memory containing instructions configured to instruct the at least one processing device to:
create namespaces for memory devices of different memory types, the namespaces including a first namespace for the first memory device, and a second namespace for the second memory device;
determine an increase in a priority for an application, the application being allocated to the second namespace;
in response to determining the increase in the priority for the application, re-allocate the application to the first namespace; and
in response to the re-allocation, store data associated to the application in the first memory device.

2. The system of claim 1, wherein a latency of the first memory device is less than a latency of the second memory device.

3. The system of claim 1, wherein the instructions are further configured to instruct the at least one processing device to:
receive, from the application, a request specifying that data associated with the application be stored in physical memory of the first memory type;
wherein binding the data associated with the application to the first namespace is performed further in response to receiving the request.

4. The system of claim 1, wherein storing the data in the first memory device comprises moving the data from the second memory device to the first memory device through a multiplexer.

5. The system of claim 1, wherein an operating system is running on the at least one processing device, and wherein the re-allocation is performed by the operating system.

6. The system of claim 5, wherein the first namespace is created by the operating system in response to a request from the application.

7. The system of claim 1, wherein creating the namespaces comprises associating a respective virtual address to each namespace.

8. The system of claim 1, wherein the re-allocating the application to the first namespace comprises storing a mapping between a virtual address of the first namespace and a first physical address of the first memory device.

9. The system of claim 8, wherein the virtual address of the first namespace is in a first address range of an address space of the at least one processing device, and wherein storing the mapping comprises storing metadata that associates the first address range with the first memory device.

10. The system of claim 8, wherein the virtual address of the first namespace corresponds to a virtual page of a process managed by an operating system using a page table.

11. The system of claim 10, wherein storing the mapping comprises generating a page table entry in the page table that maps the virtual address of the first namespace to the first physical address.

12. The system of claim 1, wherein the instructions are further configured to instruct the at least one processing device to store, by an operating system, associations between the namespaces and sets of data bound to the namespaces.

13. The system of claim 1, wherein creating the first namespace comprises storing an identification of the first namespace in memory of the first memory device.

14. A system comprising:
a first memory device of a first memory type;
a second memory device of a second memory type;
at least one processing device; and
memory containing instructions configured to instruct the at least one processing device to:
allocate a second namespace for use by an application, wherein the second namespace is a logical reference to the second memory device in which physical addresses are defined;
determine an increase in a priority of the application;
in response to determining the increase in the priority of the application, re-allocate the application to a first namespace, wherein the first namespace is a logical reference to the first memory device in which physical addresses are defined.

15. The system of claim 14, wherein the instructions are further configured to instruct the at least one processing device to access, using data from a page table, data at a first physical address in the first memory device that corresponds to the logical memory address in the first namespace.

16. The system of claim 15, wherein the data from the page table is cached in a translation lookaside buffer, and wherein a memory management unit accesses the translation lookaside buffer to translate the logical memory address to the first physical address.

17. The system of claim 15, wherein the instructions are further configured to instruct the at least one processing device to store, using data from the page table, data in the first memory device by moving the data from the second memory device to the first memory device through a multiplexer.

18. A method comprising:

creating namespaces for memory devices of different memory types, the namespaces including a first namespace for a first memory device of a first memory type, and a second namespace for a second memory device of a second memory type;

receiving a request for an allocation of memory, wherein the request specifies that data associated with an application be stored in physical memory associated with the second namespace;

determining an increase in a priority for the application; and in response to determining the increase in the priority for the application, re-allocating the application to the first namespace.

* * * * *